(12) United States Patent
Okuma

(10) Patent No.: US 12,420,360 B2
(45) Date of Patent: Sep. 23, 2025

(54) REPAIR WELDING SEGMENT DETECTION METHOD AND REPAIR WELDING SEGMENT DETECTION DEVICE

(71) Applicant: Panasonic Intellectual Property Management Co., Ltd., Osaka (JP)

(72) Inventor: Katsuaki Okuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 406 days.

(21) Appl. No.: 18/140,213

(22) Filed: Apr. 27, 2023

(65) Prior Publication Data

US 2023/0264302 A1 Aug. 24, 2023

Related U.S. Application Data

(63) Continuation of application No. PCT/JP2021/031207, filed on Aug. 25, 2021.

(30) Foreign Application Priority Data

Oct. 28, 2020 (JP) .................. 2020-180663

(51) Int. Cl.
*B23K 31/12* (2006.01)
*G06T 7/00* (2017.01)
*G06V 10/20* (2022.01)

(52) U.S. Cl.
CPC .......... *B23K 31/125* (2013.01); *G06T 7/001* (2013.01); *G06V 10/255* (2022.01);
(Continued)

(58) Field of Classification Search
CPC ............... B23K 31/125; G06V 10/255; G06V 2201/121; G06T 7/001; G06T 2207/10028; G06T 2207/30152
See application file for complete search history.

(56) References Cited

U.S. PATENT DOCUMENTS 8,168,918 B2 * 5/2012 Kawai .................... B23K 26/22
219/121.64
9,833,857 B2 * 12/2017 Artelsmair ........... B23K 9/0953
(Continued)

FOREIGN PATENT DOCUMENTS

CN 111185406 5/2020
JP 2000-167666 6/2000
(Continued)

OTHER PUBLICATIONS

International Search Report issued Oct. 26, 2021, in International (PCT) Application No. PCT/JP2021/031207, with English translation.

*Primary Examiner* — Gregory M Desire
(74) *Attorney, Agent, or Firm* — Wenderoth, Lind & Ponack, L.L.P.

(57) ABSTRACT

A repair welding segment detection method includes generating, based on a result of the inspection determination, shape mismatch data obtained by extracting a shape mismatch portion of the weld bead, dividing the shape mismatch data into N, where N is an integer of 2 or more, equally divided windows in a direction perpendicular to a welding direction of the weld bead, setting a shift region formed by i, where i: an integer of 1 or more, continuous windows among the N windows, separately calculating volumes of (N−i+1) shift regions obtained by shifting one by one the i windows forming the shift region in the welding direction, and determining that a shift region having a volume of a predetermined value or more among the calculated volumes of the (N−i+1) respective shift regions is a defective segment of the weld bead.

18 Claims, 16 Drawing Sheets

(52) U.S. Cl.
CPC ............... *G06T 2207/10028* (2013.01); *G06T 2207/30152* (2013.01); *G06V 2201/121* (2022.01)

(56) References Cited

U.S. PATENT DOCUMENTS

| | | | |
|---|---|---|---|
| 10,448,692 B2* | 10/2019 | Hsu ..................... | B23K 9/0953 |
| 10,576,565 B2* | 3/2020 | Schroth .................... | B23K 1/19 |
| 11,077,517 B2* | 8/2021 | Smitherman ......... | B23K 20/125 |
| 2014/0348415 A1 | 11/2014 | Bhattad et al. | |
| 2015/0254830 A1 | 9/2015 | Shimodaira et al. | |

FOREIGN PATENT DOCUMENTS

| | | |
|---|---|---|
| JP | 2012-037487 | 2/2012 |
| JP | 2015-169473 | 9/2015 |
| JP | 2017-148841 | 8/2017 |
| KR | 10-0615047 | 8/2006 |

* cited by examiner

FIG. 12

⟨WHEN FIRST THRESHOLD T1 = 4.0 mm³, DEAD ZONE WIDTH Z = 0.2, AND NUMBER OF WINDOWS i = 3⟩

| k = | 1 | 2 | 3 | 4 | 5 | 6 | 7 | 8 | 9 | 10 | |
|---|---|---|---|---|---|---|---|---|---|---|---|
| ΔV[k] = | 1.0 | 1.0 | 1.0 | 1.5 | 1.8 | 0.2 | 0.5 | 1.0 | 7.0 | 2.0 | |
| V[1] = | 1.0 | 1.0 | 1.0 | | | | | | | | = 3.0 < T1 : NON-DEFECTIVE |
| V[2] = | | 1.0 | 1.0 | 1.5 | | | | | | | = 3.5 < T1 : NON-DEFECTIVE |
| V[3] = | | | 1.0 | 1.5 | 1.8 | | | | | | = 4.3 ≧ T1 AND PREVIOUS SHIFT REGION IS NON-DEFECTIVE (START POINT) |
| V[4] = | | | | 1.5 | 1.8 | 0.2 | | | | | = 3.5 > T2 : DEFECTIVE |
| V[5] = | | | | | 1.8 | 0.2 | 0.5 | | | | = 2.5 ≦ T2 AND PREVIOUS SHIFT REGION IS DEFECTIVE (END POINT) |
| V[6] = | | | | | | 0.2 | 0.5 | 1.0 | | | = 1.7 < T1 : NON-DEFECTIVE |
| V[7] = | | | | | | | 0.5 | 1.0 | 7.0 | | = 8.5 ≧ T1 AND PREVIOUS SHIFT REGION IS NON-DEFECTIVE (START POINT) |
| V[8] = | | | | | | | | 1.0 | 7.0 | 2.0 | = 9.0 ≧ T2 : END POINT |

⟨DEFECTIVE SEGMENT⟩

| | RCE1 | | | RCE2 | | | RCF1 | | | RCF2 | |
|---|---|---|---|---|---|---|---|---|---|---|---|
| k = | 1 | 2 | 3 | 4 | 5 | 6 | 7 | 8 | 9 | 10 | |
| ΔV[k] = | 1.0 | 1.0 | 1.0 | 1.5 | 1.8 | 0.2 | 0.5 | 1.0 | 7.0 | 2.0 | |

↕ RCE   ↕ RCF

REPAIR WELDING SEGMENT DETECTION METHOD AND REPAIR WELDING SEGMENT DETECTION DEVICE

CROSS-REFERENCE TO RELATED APPLICATIONS

This is a continuation of International Application No. PCT/JP2021/031207 filed on Aug. 25, 2021, and claims priority from Japanese Patent Application No. 2020-180663 filed on Oct. 28, 2020, the entire content of which is incorporated herein by reference.

TECHNICAL FIELD

The present disclosure relates to a repair welding segment detection method and a repair welding segment detection device.

BACKGROUND ART

Patent Literature 1 discloses a shape inspection device that projects slit light onto a weld bead, images shape lines sequentially formed on the weld bead by scanning the weld bead with the slit light, and acquires a three-dimensional shape of the weld bead as point cloud data based on imaging data of the sequentially formed shape lines. The shape inspection device sets, on the weld bead displayed based on the point cloud data and according to an input, an optional cutting line different from the shape lines formed by scanning the weld bead with the slit light, and calculates a cross-sectional shape of the weld bead at the cutting line based on point cloud data corresponding to the cutting line. In addition, the shape inspection device compares various feature amounts calculated according to the calculated cross-sectional shape with allowable ranges of various feature amounts registered in advance, and determines whether the feature amounts are good or poor.

CITATION LIST

Patent Literature

Patent Literature 1: JP2012-37487A

SUMMARY OF INVENTION

The present disclosure provides a repair welding segment detection method and a repair welding segment detection device that more accurately detect a repair welding segment of a workpiece produced by main welding.

The present disclosure provides a repair welding segment detection method including entering input data regarding a weld bead of a workpiece produced by welding; executing inspection determination regarding a shape of the weld bead by using the input data and master data of a non-defective workpiece; generating, based on a result of the inspection determination, shape mismatch data obtained by extracting a shape mismatch portion of the weld bead; dividing the shape mismatch data into N, where N is an integer of 2 or more, equally divided windows in a direction perpendicular to a welding direction of the weld bead; setting a shift region formed by i, where i: an integer of 1 or more, continuous windows among the N windows; separately calculating volumes of (N−i+1) shift regions obtained by shifting one by one the i windows forming the shift region in the welding direction; and determining that a shift region having a volume of a predetermined value or more among the calculated volumes of the (N−i+1) respective shift regions is a defective segment of the weld bead.

Further, the present disclosure provides a repair welding segment detection device including an input unit configured to enter input data regarding a weld bead of a workpiece produced by welding; a determination unit configured to execute inspection determination regarding a shape of the weld bead by using the input data and master data of a non-defective workpiece; a data generation unit configured to generate, based on an inspection determination result obtained by the determination unit, shape mismatch data obtained by extracting a shape mismatch portion of the weld bead; a calculation unit configured to divide the shape mismatch data into N, where N is an integer of 2 or more, equally divided windows in a direction perpendicular to a welding direction of the weld bead, set a shift region formed by i, where i is an integer of 1 or more, continuous windows among the respective windows, and separately calculate volumes of (N−i+1) respective shift regions obtained by shifting one by one the i windows forming the shift region in the welding direction; and a generation unit configured to determine that a shift region having a volume of a predetermined value or more among the calculated volumes of the (N−i+1) shift regions is a defective segment of the weld bead, and generate information regarding the defective segment.

Advantageous Effects of Invention

According to the present disclosure, it is possible to more accurately detect a repair welding segment of a workpiece produced by main welding.

BRIEF DESCRIPTION OF DRAWINGS

Exemplary embodiment(s) of the present invention will be described in detail based on the following figures, wherein:

FIG. 12 is a diagram illustrating a determination example of the processings of the defect determination and the defective segment determination according to the modification of the embodiment:

Figure 1:
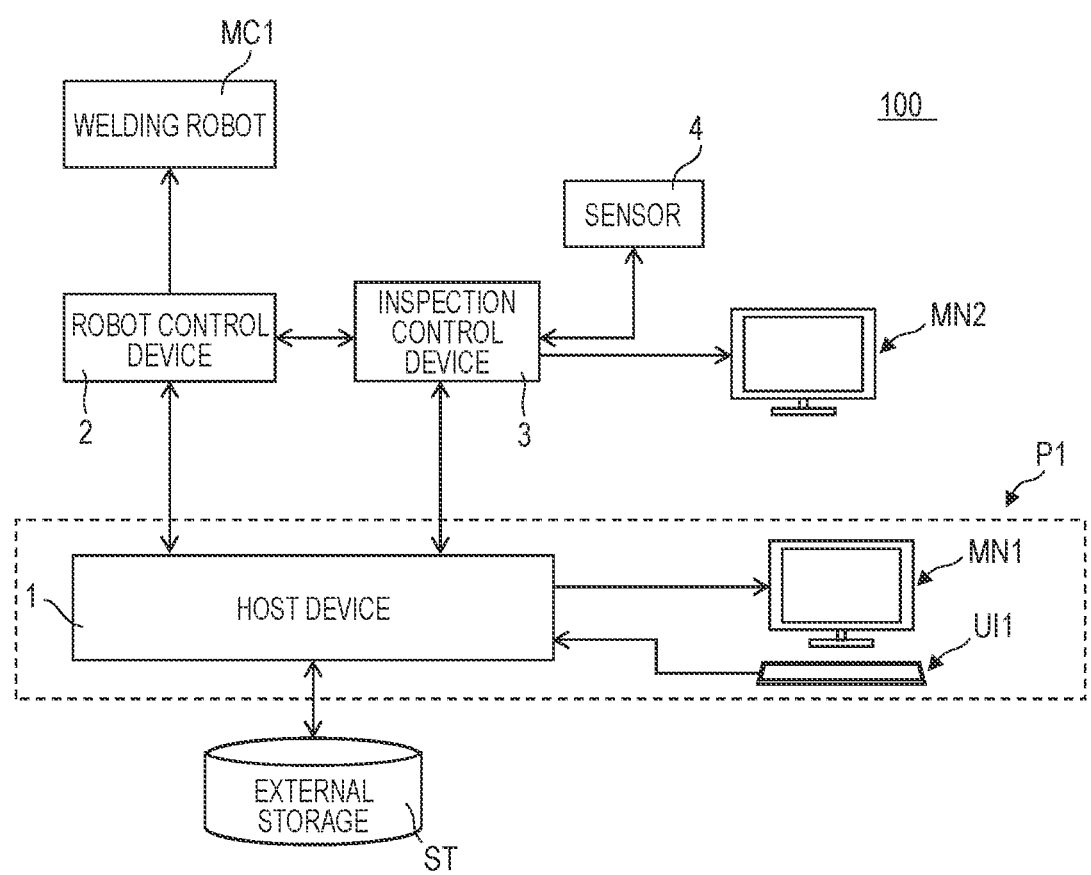
FIG. 1 is a schematic diagram showing a system configuration example of a welding system.

DESCRIPTION OF EMBODIMENTS (Background of Present Disclosure)

There is known in the related art a device configuration that automatically executes an appearance shape inspection of a weld bead such as determining that a workpiece produced by main welding is non-defective when calculated values of feature amounts (for example, bead width and bead height) related to a shape of a weld bead of the workpiece are within allowable ranges as in Patent Literature 1.

However, a shape of a weld bead may fluctuate due to changes in working environment, deterioration of consumables used for welding, dirt adhering to a workpiece surface, and the like. The fluctuation in appearance shape of the weld bead does not necessarily affect a welding quality, and repair welding may be unnecessary. However, when the necessity of the repair welding is determined based on a feature amount of a shape mismatch portion of an entire weld bead calculated by comparing a shape of a non-defective workpiece and a shape of a workpiece to be inspected, as in the appearance shape inspection of the weld bead in the related art, it may be determined that the repair welding is necessary. For example, in the appearance shape inspection of the weld bead in the related art, when an area of the shape mismatch portion is large and the fluctuation in shape is small (specifically, when a reinforcement height is slightly insufficient over the entire length of the weld bead, when a position of the weld bead is slightly displaced over the entire length, etc.), although a welding quality standard is satisfied, repair welding may be determined to be necessary and unnecessary repair welding may be executed.

Therefore, in the following embodiment, an example of a repair welding segment detection method and a repair welding segment detection device that more accurately detect a repair welding segment of a workpiece produced by main welding will be described.

Hereinafter, an embodiment specifically disclosing a repair welding segment detection method and a repair welding segment detection device according to the present disclosure will be described in detail with reference to the drawings as appropriate. However, unnecessarily detailed description may be omitted. For example, detailed description of well-known matters and redundant description of substantially the same configuration may be omitted. This is to avoid unnecessary redundancy of the following description and to facilitate understanding of those skilled in the art. It should be noted that the accompanying drawings and the following description are provided to allow those skilled in the art to fully understand the present disclosure, and are not intended to limit subject matters described in the claims.

According to the embodiment, the repair welding segment detection device inputs input data regarding a weld bead of a workpiece produced by main welding, and executes bead appearance inspection regarding a shape of the weld bead by using the input data and master data of a non-defective workpiece based on comparison between the input data and the master data. A repair welding program creation system determines a defective segment (that is, a repair welding segment that requires repair welding) for each welding defective portion determined to require repair welding as a result of the bead appearance inspection.

Hereinafter, an object (for example, metal) subject to main welding is defined as an "original workpiece", and an object produced (manufactured) by the main welding is defined as a "workpiece". It should be noted that the "workpiece" may be defined to include a "repair workpiece" in which a welding defective portion detected by the appearance inspection is repair welded. In addition, the "workpiece" is not limited to a workpiece produced by the main welding executed once, and may be a composite workpiece produced by the main welding executed two or more times.

A process of producing a workpiece by joining an original workpiece and another original workpiece by a welding robot or the like is defined as "main welding", and a process in which correction such as repair is performed on a defective portion of a workpiece by a welding robot is defined as "repair welding".

(Configuration of Welding System)

FIG. 1 is a schematic diagram showing a system configuration example of a welding system 100. The welding system 100 is a configuration including a host device 1 connected to each of an external storage ST, an input interface UI1, and a monitor MN1, a robot control device 2, an inspection control device 3, a sensor 4, a welding robot MC1, and a monitor MN2. In FIG. 1, the sensor 4 is illustrated as a separate body from the welding robot MC1, but may be provided integrally with the welding robot MC1 (see FIG. 2). It should be noted that the monitor MN2 is not an essential component and may be omitted.

The host device 1 integrally controls start and completion of main welding executed by the welding robot MC1 via the robot control device 2. For example, the host device 1 reads out, from the external storage ST, welding related information input or set in advance by a user (for example, a welding operator or a system administrator. The same applies hereinafter), generates a main welding execution command including contents of the welding related information by using the welding related information, and transmits the main welding execution command to the corresponding robot control device 2. When the main welding executed by the welding robot MC1 is completed, the host device 1 receives, from the robot control device 2, a main welding completion report indicating that the main welding executed by the welding robot MC1 is completed, updates to a status indicating that the corresponding main welding is completed, and records the status in the external storage ST.

It should be noted that the main welding execution command described above is not limited to being generated by the host device 1, and may be generated by, for example, an operation panel (for example, PLC: programmable logic controller) of equipment in a factory or the like where the main welding is executed, or an operation panel (for example, TP: teach pendant) of the robot control device 2. It should be noted that the teach pendant (TP) is a device for operating the welding robot MC1 connected to the robot control device 2.

In addition, the host device 1 integrally controls start and completion of the bead appearance inspection using the robot control device 2, the inspection control device 3, and the sensor 4. For example, when the host device 1 receives the main welding completion report from the robot control device 2, the host device 1 generates a bead appearance inspection execution command for a workpiece produced by the welding robot MC1, and transmits the bead appearance inspection execution command to each of the robot control device 2 and the inspection control device 3. When the bead appearance inspection is completed, the host device 1 receives, from the inspection control device 3, an appearance inspection report indicating that the bead appearance inspection is completed, updates to a status indicating that the corresponding bead appearance inspection is completed, and records the status in the external storage ST.

Here, the welding related information is information indicating contents of the main welding executed by the welding robot MC1, and is generated in advance for each process of the main welding and is registered in the external storage ST. The welding related information includes, for example, the number of original workpieces used in the main welding, workpiece information including an ID, a name, and a welded portion of an original workpiece used in the main welding, a scheduled execution date on which the main welding is executed, the number of welded workpieces to be produced, and various welding conditions during the main welding. It should be noted that the welding related information is not limited to data of items described above, and may include, for example, data related to a welding direction when the main welding is executed (that is, data of position information indicating an operation trajectory of the welding robot MC1). In addition, the data regarding the welding direction may be included in a teaching program of the welding robot MC1. Further, the welding direction data of the welding robot MC1 may be generated in advance as welding direction data by inputting welding line information together with the master data by user operation, and may be stored in a memory 32 in the inspection control device 3.

Based on the main welding execution command transmitted from the host device 1, the robot control device 2 causes the welding robot MC1 to execute main welding using an original workpiece designated by the execution command. It should be noted that the welding related information described above is not limited to being managed by the host device 1 with reference to the external storage ST, and may be managed by, for example, the robot control device 2. In this case, since the robot control device 2 can know a state in which the main welding is completed, an actual execution date may be managed instead of the scheduled execution date, on which a welding process is scheduled to be executed, in the welding related information. Also, it should be noted that although a type of the main welding is not limited in the present specification, in order to make the description easy to understand, a process of joining a plurality of original workpieces to produce a workpiece will be described as an example.

The host device 1 is separately connected to the monitor MN1, the input interface UI1, and the external storage ST such that the host device 1 can input data to and output data from each of the monitor MN1, the input interface UI1, and the external storage ST, and further connected to the robot control device 2 such that data can be communicated between the host device 1 and the robot control device 2. The host device 1 may be a terminal device P1 that includes the monitor MN1 and the input interface UI1 in an integrated manner, and may further include the external storage ST in an integrated manner. In this case, the terminal device P1 is a personal computer (PC) that is used by the user before the main welding is executed. It should be noted that the terminal device P1 is not limited to the PC described above, and may be a computer device having a communication function, such as a smartphone or a tablet terminal.

The monitor MN1 may be formed using a display device such as a liquid crystal display (LED) or an organic electroluminescence (EL). The monitor MN1 may display, for example, a screen showing a notification indicating that the main welding is completed or a notification indicating that the bead appearance inspection is completed, which is output from the host device 1. In addition, a speaker (not shown) may be connected to the host device 1 instead of the monitor MN1 or together with the monitor MN1, and the host device 1 may output, via the speaker, a sound of a content indicating that the main welding is completed or a content indicating that the bead appearance inspection is completed.

The input interface UI1 is a user interface that detects an input operation of the user and outputs the input operation to the host device 1, and may be formed using, for example, a mouse, a keyboard, or a touch panel. The input interface UI1 receives, for example, an input operation when the user creates the welding related information or an input operation when the main welding execution command is transmitted to the robot control device 2.

The external storage ST is formed using, for example, a hard disk drive or a solid state drive. The external storage ST stores, for example, data of welding related information created for each main welding, a status of a workpiece produced by the main welding (production status), and workpiece information of the workpiece (see description above).

The robot control device 2 is connected to the host device 1 such that data can be communicated between the robot control device 2 and the host device 1, and is connected to the welding robot MC1 such that data can be communicated between the robot control device 2 and the welding robot MC1. When the robot control device 2 receives the main welding execution command transmitted from the host device 1, the robot control device 2 controls the corresponding welding robot MC1 based on the execution command to execute the main welding. When the robot control device 2 detects that the main welding is completed, the robot control device 2 generates a main welding completion report indicating that the main welding is completed, and notifies the host device 1 of the main welding completion report. Accordingly, the host device 1 can appropriately detect the completion of the main welding by the robot control device 2. It should be noted that a method of detecting completion of main welding by the robot control device 2 may be, for example, a method of determining completion of main welding based on a signal indicating the completion of the main welding from a sensor (not shown) provided in a wire feeding device 300, or may be a known method, and contents of the method of detecting completion of main welding is not limited.

In addition, when the robot control device 2 receives a bead appearance inspection execution command transmitted from the host device 1, the robot control device 2 controls the welding robot MC1 (see FIG. 2) to which the sensor 4 is attached according to an appearance inspection program created or prepared in advance by the robot control device 2, and executes bead appearance inspection of a corresponding workpiece based on the execution command. It should be noted that although the appearance inspection report indicating that the bead appearance inspection is completed is transmitted from the inspection control device 3 to the host device 1, the appearance inspection report may be transmitted to the host device 1 from the robot control device 2 itself or from the robot control device 2 receiving an instruction from the inspection control device 3. Accordingly, the host device 1 can appropriately detect the completion of the bead appearance inspection.

The welding robot MC1 is connected to the robot control device 2 such that data can be communicated between the welding robot MC1 and the robot control device 2. The welding robot MC1 executes main welding commanded from the host device 1 under control of a corresponding robot control device 2. In addition, when the sensor 4 is integrally attached to the welding robot MC1, the welding robot MC1 moves the sensor 4 according to the appearance inspection program, thereby assisting in executing the bead appearance inspection commanded from the host device 1.

The inspection control device 3 as an example of the repair welding segment detection device is separately connected to the host device 1, the robot control device 2, and the sensor 4 such that data can be communicated among the inspection control device 3, the host device 1, the robot control device 2, and the sensor 4. When the inspection control device 3 receives the bead appearance inspection execution command transmitted from the host device 1, the inspection control device 3 executes, in cooperation with the sensor 4, the bead appearance inspection on a welded portion of a workpiece produced by the welding robot MC1 (for example, inspection of whether a weld bead formed in a workpiece satisfies a predetermined welding standard). It should be noted that although details of the bead appearance inspection will be described later with reference to FIG. 4 to FIG. 10, for example, the inspection control device 3 uses input data regarding the shape of the weld bead acquired by the sensor 4 (for example, point cloud data that can specify a three-dimensional shape of the weld bead) based on welded portion information of the workpiece included in the bead appearance inspection execution command to execute the bead appearance inspection based on comparison with master data of a non-defective workpiece predetermined for each workpiece.

The inspection control device 3 executes bead appearance inspection, generates an appearance inspection report including an inspection determination result of the bead appearance inspection and a notification indicating that the bead appearance inspection is completed, transmits the appearance inspection report to the host device 1, and outputs the appearance inspection report to the monitor MN2. It should be noted that when the inspection control device 3 determines that a defect is detected in the bead appearance inspection of the workpiece, the inspection control device 3 generates an appearance inspection report including an appearance inspection result including information regarding a defective segment for repair welding of the defect, and transmits the appearance inspection report to the host device 1 and the robot control device 2.

In addition, when the inspection control device 3 determines that a defect is detected by the bead appearance inspection of the workpiece, the inspection control device 3 generates, by using the appearance inspection result including the information regarding the defective segment, a repair welding program for performing correction such as repair on the defective portion. The inspection control device 3 transmits, to the host device 1 or the robot control device 2, the repair welding program and the appearance inspection result in association with each other.

The sensor 4 is connected to the inspection control device 3 such that data can be communicated between the sensor 4 and the inspection control device 3. When the sensor 4 is attached to the welding robot MC1 (see FIG. 2), the sensor 4 can be operated to three-dimensionally scan a mounting table on which a workpiece Wk is placed in accordance with driving of a manipulator 200 under the control of the robot control device 2. The sensor 4 acquires data (for example, point cloud data) that can specify a three-dimensional shape of the workpiece Wk placed on the mounting table (see FIG. 2) in accordance with the driving of the manipulator 200 under the control of the robot control device 2, and transmits the data to the inspection control device 3.

The monitor MN2 may be formed using a display device such as an LED or an organic EL. The monitor MN2 displays a screen showing, for example, the notification indicating that the bead appearance inspection is completed, which is output from the inspection control device 3, or the notification and an appearance inspection result (information that notifies presence or absence of a defect, the information regarding the defective segment, volume data of a weld bead lacking in the defective segment, etc.), which are output from the inspection control device 3. In addition, a speaker (not shown) may be connected to the inspection control device 3 instead of the monitor MN2 or together with the monitor MN2, and the inspection control device 3 may output, via the speaker, a sound indicating a content of the notification indicating that the appearance inspection is completed or the notification and the appearance inspection result (for example, the inspection determination result described above).

Figure 2:
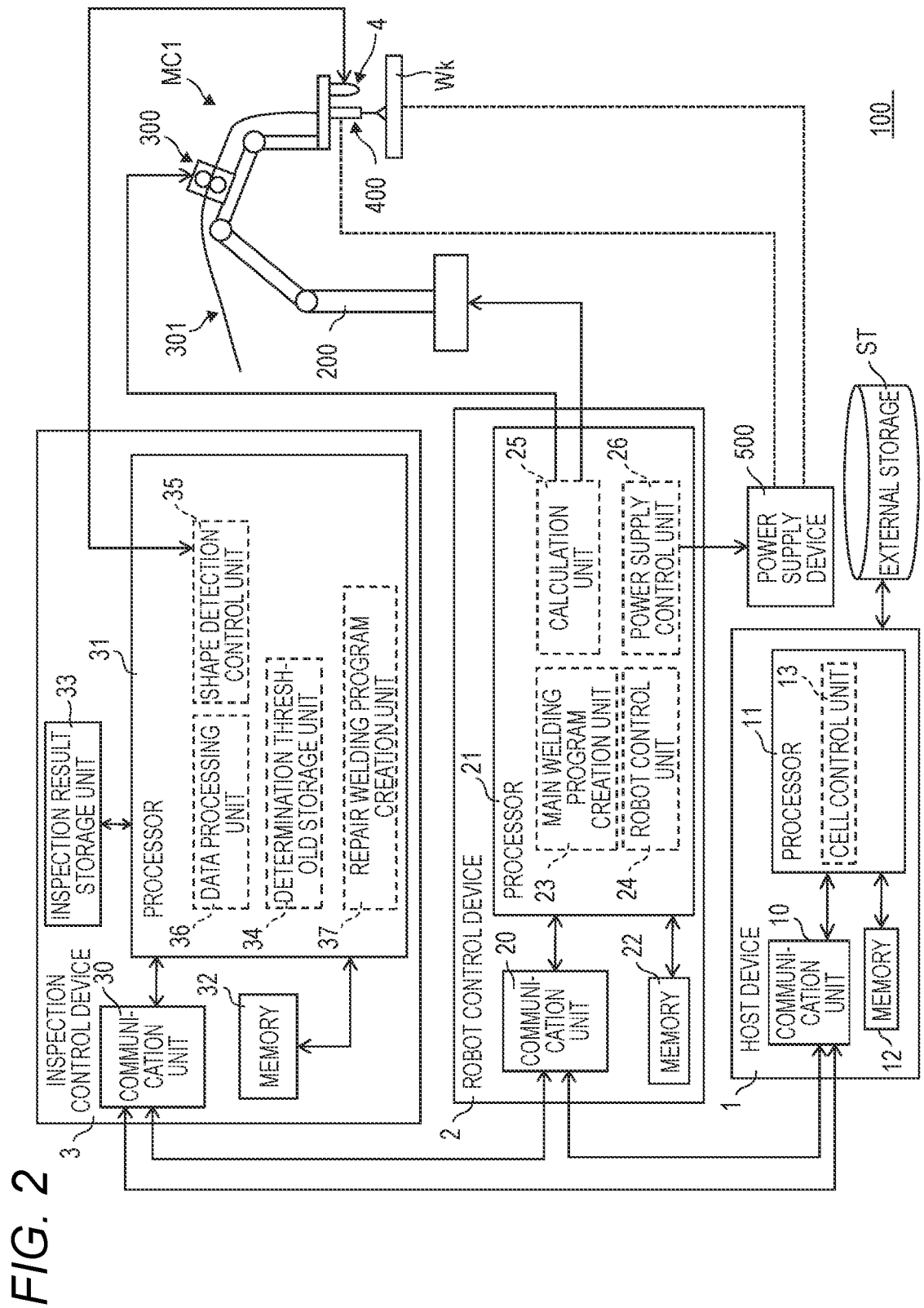
FIG. 2 is a diagram showing an internal configuration example of an inspection control device, a robot control device, and a host device according to an embodiment.

FIG. 2 is a diagram showing an internal configuration example of the inspection control device 3, the robot control device 2, and the host device 1 according to the embodiment. In order to make the description easy to understand, illustration of the monitor MN1 and MN2 and the input interface UI1 is omitted in FIG. 2. It should be noted that the workpiece Wk shown in FIG. 2 is a workpiece to be subjected to the bead appearance inspection. The workpiece Wk may be a workpiece produced by main welding, or a so-called repair workpiece that has been repaired one or more times by repair welding.

Under the control of the robot control device 2, the welding robot MC1 executes various processes such as the main welding commanded from the host device 1 and a movement of the sensor 4 during the bead appearance inspection. The welding robot MC1 executes, for example, arc welding in the process of the main welding. However, the welding robot MC1 may execute welding (for example, laser welding and gas welding) other than the arc welding. In this case, although not shown, a laser head, instead of a welding torch 400, may be connected to a laser oscillator via an optical fiber. The welding robot MC1 is a configuration including at least the manipulator 200, the wire feeding device 300, a welding wire 301, and the welding torch 400.

The manipulator 200 includes an articulated arm, and moves each arm based on a control signal from a robot control unit 24 of the robot control device 2. Accordingly, the manipulator 200 can change a positional relationship between the workpiece Wk and the welding torch 400 (for example, an angle of the welding torch 400 relative to the workpiece Wk) by driving the arm.

The wire feeding device 300 controls a feeding speed of the welding wire 301 based on the control signal from the robot control device 2. It should be noted that the wire feeding device 300 may include a sensor (not shown) that can detect a remaining amount of the welding wire 301. Based on an output of the sensor, the robot control device 2 can detect that the process of the main welding is completed.

The welding wire 301 is held by the welding torch 400. When power is supplied from a power supply device 500 to the welding torch 400, an arc is generated between a tip end of the welding wire 301 and the workpiece Wk. and the arc welding is executed. It should be noted that illustration and description of a configuration and the like for supplying shielding gas to the welding torch 400 are omitted for the convenience of description.

The host device 1 generates execution commands of various processes of the main welding or the bead appearance inspection by using the welding related information input or set in advance by the user, and transmits the execution commands to the robot control device 2. It should be noted that as described above, when the sensor 4 is integrally attached to the welding robot MC1, the bead appearance inspection execution command is transmitted to both the robot control device 2 and the inspection control device 3. The host device 1 is a configuration including at least a communication unit 10, a processor 11, and a memory 12.

The communication unit 10 is separately connected to the robot control device 2 and the external storage ST such that data can be communicated among the communication unit 10, the robot control device 2, and the external storage ST. The communication unit 10 transmits, to the robot control device 2, the execution commands of various processes of the main welding or the bead appearance inspection generated by the processor 11. The communication unit 10 receives the main welding completion report and the appearance inspection report that are transmitted from the robot control device 2, and outputs the main welding completion report and the appearance inspection report to the processor 11. It should be noted that the main welding execution command may include, for example, a control signal for controlling each of the manipulator 200, the wire feeding device 300, and the power supply device 500 included in the welding robot MC1.

The processor 11 is configured by using, for example, a central processing unit (CPU) or a field programmable gate array (FPGA), and executes various processings and controls in cooperation with the memory 12. Specifically, the processor 11 implements functions of a cell control unit 13 by referring to a program stored in the memory 12 and executing the program.

The memory 12 includes, for example, a random access memory (RAM) as a work memory used when a processing of the processor 11 is executed, and a read only memory (ROM) that stores a program that defines a processing of the processor 11. Data generated or acquired by the processor 11 is temporarily stored in the RAM. The program that defines a processing of the processor 11 is written into the ROM. In addition, the memory 12 separately stores the data of the welding related information read out from the external storage ST, the status of the workpiece, and data of the workpiece information of the workpiece (see description above) transmitted from the robot control device 2.

The cell control unit 13 generates, based on the welding related information stored in the external storage ST, an execution command for executing the main welding, the bead appearance inspection of the workpiece, or the repair welding. In addition, based on the welding related information stored in the external storage ST, the cell control unit 13 creates an appearance inspection program related to driving of the welding robot MC1 during bead appearance inspection on the workpiece Wk after the main welding is executed or the repair welding is executed one or more times, and further creates an appearance inspection program execution command including the appearance inspection program. It should be noted that the appearance inspection program may be created in advance and stored in the external storage ST, and in this case, the cell control unit 13 simply reads out and acquires the appearance inspection program from the external storage ST. The cell control unit 13 may generate different execution commands for various processes of main welding to be executed by the welding robot MC1. The main welding execution command or the appearance inspection program execution command including the appearance inspection program, which is generated by the cell control unit 13, is transmitted to a corresponding robot control device 2 or to each of the robot control device 2 and the inspection control device 3 via the communication unit 10.

The robot control device 2 controls a processing of a corresponding welding robot MC1 (for example, the sensor 4, the manipulator 200, the wire feeding device 300, and the power supply device 500) based on the main welding execution command or the bead appearance inspection execution command transmitted from the host device 1. The robot control device 2 is a configuration including at least a communication unit 20, a processor 21, and a memory 22.

The communication unit 20 is connected to the host device 1, the inspection control device 3, and the welding robot MC1 such that data can be communicated among the communication unit 20, the host device 1, the inspection control device 3, and the welding robot MC1. It should be noted that although illustration is simplified in FIG. 2, data is transmitted and received between the robot control unit 24 and the manipulator 200, between the robot control unit 24 and the wire feeding device 300, and between a power supply control unit 25 and the power supply device 500 via the communication unit 20. The communication unit 20 receives the main welding execution command or the bead appearance inspection execution command transmitted from the host device 1. The communication unit 20 transmits the workpiece information of the workpiece produced by the main welding to the host device 1.

Here, the workpiece information not only includes an ID of the workpiece but also includes at least an ID, a name, and a welded portion of an original workpiece used in the main welding, and a welding condition at the time of executing the main welding. Further, the workpiece information may include, for example, position information indicating a defective segment for each defective portion or position information indicating a start point and an end point for each defective segment as position information indicating a defective portion of the workpiece. In addition, the welding condition includes, for example, a material and a thickness of the original workpiece, a material and a wire diameter of the welding wire 301, a type of the shielding gas, a flow rate of the shielding gas, a set average value of a welding current, a set average value of a welding voltage, a feeding speed and a feeding amount of the welding wire 301, the number of times of welding, and welding time. Further, in addition to the above, the welding condition may include, for example, information indicating a type of the main welding (for example, TIG welding, MAG welding, and pulse welding), a moving speed and a moving time of the manipulator 200.

The processor 21 is formed using, for example, a CPU or an FPGA, and executes various processings and controls in cooperation with the memory 22. Specifically, the processor 21 implements functions of a main welding program creation unit 23, the robot control unit 24, and the power supply control unit 25 by referring to a program stored in the memory 22 and executing the program. In addition, the processor 21 executes, based on a main welding program generated by the main welding program creation unit 23, calculation of a parameter for controlling the welding robot MC1 (specifically, each of the manipulator 200, the wire feeding device 300, and the power supply device 500) controlled by the robot control unit 24.

The memory 22 includes, for example, a RAM as a work memory used when a processing of the processor 21 is executed, and a ROM that stores a program that defines a processing of the processor 21. Data generated or acquired by the processor 21 is temporarily stored in the RAM. The program that defines a processing of the processor 21 is written into the ROM. In addition, the memory 22 separately stores data of the main welding execution command or the bead appearance inspection execution command transmitted from the host device 1, and data of the workpiece information of the workpiece produced by the main welding. In addition, the memory 22 stores a main welding program of the main welding to be executed by the welding robot MC1. The main welding program is a program that defines a specific procedure (process) of main welding in which a plurality of original workpieces are joined by using a welding condition of the main welding.

Based on the main welding execution command transmitted from the host device 1 via the communication unit 20, the main welding program creation unit 23 uses workpiece information (for example, an ID, a name, and a welded portion of an original workpiece) of each of a plurality of original workpieces included in the execution command to generate the main welding program of the main welding to be executed by the welding robot MC1. The main welding program may include various parameters such as a welding current, a welding voltage, an offset amount, a welding speed, and a posture of the welding torch 400 for controlling the power supply device 500, the manipulator 200, the wire feeding device 300, the welding torch 400, and the like during the execution of the main welding. It should be noted that the main welding program may be stored in the processor 21 or may be stored in the RAM of the memory 22.

The robot control unit 24 generates a control signal for driving the welding robot MC1 (specifically, the manipulator 200, the wire feeding device 300, and the power supply device 500) based on the main welding program generated by the main welding program creation unit 23. The robot control unit 24 transmits the generated control signal to the welding robot MC1. In addition, the robot control unit 24 drives, based on the appearance inspection program transmitted from the host device 1, the manipulator 200 of the welding robot MC1 during the bead appearance inspection so as to cover an operation range of the welding robot MC1 defined by the main welding program. Accordingly, the sensor 4 (see FIG. 2) attached to the welding robot MC1 can move in accordance with an operation of the welding robot MC1, and can acquire input data regarding a shape of a weld bead of the workpiece Wk (for example, point cloud data that can specify a three-dimensional shape of the weld bead).

The power supply control unit 25 drives the power supply device 500 based on a calculation result of the main welding program generated by the main welding program creation unit 23.

The inspection control device 3 controls, based on the bead appearance inspection execution command transmitted from the host device 1, a processing of the bead appearance inspection on a workpiece produced by main welding executed by the welding robot MC1 or a workpiece repaired by the repair welding executed one or more times. The bead appearance inspection is, for example, an inspection of whether a weld bead formed in a workpiece satisfies a predetermined welding standard (for example, a welding quality standard required by each of the users), and is formed by the inspection determination described above. The inspection control device 3 determines (inspects) whether an appearance shape of a weld bead formed in the workpiece Wk satisfies a predetermined welding standard based on the input data regarding the shape of the weld bead acquired by the sensor 4 (for example, point cloud data that can specify a three-dimensional shape of the weld bead). The inspection control device 3 is a configuration including at least a communication unit 30, a processor 31, a memory 32, and an inspection result storage unit 33.

The communication unit 30 is connected to the host device 1, the robot control device 2, and the sensor 4 such that data can be communicated among the communication unit 30, the host device 1, the robot control device 2, and the sensor 4. It should be noted that although illustration is simplified in FIG. 2, data is transmitted and received between a shape detection control unit 35 and the sensor 4 via the communication unit 30. The communication unit 30 receives the bead appearance inspection execution command transmitted from the host device 1. The communication unit 30 transmits, to the host device 1, an inspection determination result of the bead appearance inspection (for example, presence or absence of a defect of a weld bead in a workpiece, position information regarding a defective segment for each defective portion, and volume data of a weld bead lacking in the defective segment) executed by the sensor 4.

The processor 31 is formed using, for example, a CPU or an FPGA, and executes various processings and controls in cooperation with the memory 32. Specifically, the processor 31 implements functions of a determination threshold storage unit 34, the shape detection control unit 35, a data processing unit 36, and a repair welding program creation unit 37 by referring to a program stored in the memory 32 and executing the program.

The memory 32 includes, for example, a RAM as a work memory used when a processing of the processor 31 is executed, and a ROM that stores a program that defines a processing of the processor 31. Data generated or acquired by the processor 31 is temporarily stored in the RAM. The program that defines a processing of the processor 31 is written into the ROM. In addition, the memory 32 separately stores data of the bead appearance inspection execution command of the workpiece transmitted from the host device 1, and data of the workpiece information of the workpiece.

The inspection result storage unit 33 is formed using, for example, a hard disk or a solid state drive. The inspection result storage unit 33 stores data indicating an inspection determination result of bead appearance inspection of a welded portion of the workpiece Wk (for example, a workpiece) as an example of the data generated or acquired by the processor 31. The data indicating an inspection determination result of bead appearance inspection is generated by, for example, the data processing unit 36.

The determination threshold storage unit 34 stores set values (for example, various set values for executing defect determination described later) and thresholds (for example, a threshold regarding a volume of a weld bead used in defect determination, information regarding a dead zone width for detecting an end point of a defective segment, etc.) used in a bead appearance inspection processing according to the welded portion. In addition, the determination threshold storage unit 34 may store, as each threshold during the bead appearance inspection, an allowable range that satisfies a minimum welding standard (quality) required by a customer or the like (for example, a minimum allowable value, a maximum allowable value, or the like).

Based on a bead appearance inspection execution command of a welded portion of the workpiece Wk transmitted from the host device 1, the shape detection control unit 35 as an example of an input unit acquires the input data regarding the shape of the weld bead transmitted from the sensor 4 (for example, point cloud data that can specify a three-dimensional shape of the weld bead) while the robot control device 2 operates the welding robot MC1 to which the sensor 4 is attached based on the appearance inspection program. When the sensor 4 reaches a position where the sensor 4 can image a weld bead (in other words, can detect a three-dimensional shape of a welded portion) in accordance with the driving of the manipulator 200 by the robot control device 2 as described above, the shape detection control unit 35 causes the sensor 4 to emit, for example, a laser beam to acquire the input data regarding the shape of the weld bead (for example, point cloud data that can specify a three-dimensional shape of the weld bead). When the shape detection control unit 35 receives the input data acquired by the sensor 4, the shape detection control unit 35 transmits the input data to the data processing unit 36.

When the data processing unit 36 as an example of a determination unit, a data generation unit, a calculation unit, and a generation unit acquires the input data (see description above) regarding the shape of the weld bead from the shape detection control unit 35, the data processing unit 36 converts the acquired input data into a data format suitable for the bead appearance inspection. It should be noted that the data processing unit 36 may count the number of times the bead appearance inspection is executed for each defective portion determined to be defective, and determine that it is difficult or it is less likely to correct the defective portion by repair welding when a welding inspection result is not good even if the number of times of the bead appearance inspection exceeds the number of times stored in advance in the memory 32. In this case, the data processing unit 36 generates an alert screen including workpiece information for which it is determined that it is difficult or it is less likely to correct the defective portion by repair welding, information regarding a position of a defective segment for repair welding of the defective portion, and a type of a defect (for example, a hole, a pit, an undercut, and a protrusion), and transmits the generated alert screen to the host device 1 via the communication unit 30. The alert screen transmitted to the host device 1 is displayed on the monitor MN1. It should be noted that the alert screen may be displayed on the monitor MN2.

The data processing unit 36 uses the threshold for bead appearance inspection stored in the determination threshold storage unit 34 to execute the bead appearance inspection based on comparison between the input data regarding the shape of the weld bead acquired by the sensor 4 and the master data of a non-defective workpiece predetermined for each workpiece. Specifically, the data processing unit 36 executes comparison (so-called image processing) between the data converted by the data processing unit 36 (for example, image data generated based on the point cloud data) and the master data of the non-defective workpiece, and extracts a shape mismatch portion where the shape of the weld bead indicated by the input data is determined to be mismatch. The data processing unit 36 generates shape mismatch data based on the extracted shape mismatch portion of the input data, and determines defect determination as to whether there is a defective portion that requires repair welding for each shape mismatch portion included in the generated shape mismatch data, and a position of a defective segment of the defective portion.

The data processing unit 36 creates an appearance inspection report including a defect determination result as an inspection determination result (that is, information indicating presence or absence of a defect that requires repair welding) and information regarding a defective segment for each defective portion and stores the appearance inspection report in the inspection result storage unit 33, and transmits the appearance inspection report to the host device 1 or the robot control device 2 via the communication unit 30. In addition, when the data processing unit 36 determines that there is no defective portion that requires repair welding in the workpiece Wk to be inspected, the data processing unit 36 creates an appearance inspection report including an inspection determination result indicating that a result of the bead appearance inspection is successful and stores the appearance inspection report in the inspection result storage unit 33, and transmits the appearance inspection report to the host device 1 via the communication unit 30.

The repair welding program creation unit 37 generates a repair welding program for the workpiece Wk to be executed by the welding robot MC1 by using the appearance inspection report of the workpiece Wk created by the data processing unit 36. The repair welding program may include various parameters such as a welding current, a welding voltage, an offset amount, a welding speed, and a posture of the welding torch 400 for controlling the power supply device 500, the manipulator 200, the wire feeding device 300, the welding torch 400, and the like during the execution of the repair welding. It should be noted that the generated repair welding program may be stored in the processor 31, may be stored in the RAM of the memory 32, or may be transmitted to the host device 1 or the robot control device 2 via the communication unit 30 in association with the appearance inspection report.

The sensor 4 is, for example, a three-dimensional shape sensor, is attached to a tip end of the welding robot MC1, can acquire a plurality of point cloud data capable of specifying a shape of a welded portion of the workpiece Wk (for example, a workpiece), and generates point cloud data that can specify a three-dimensional shape of the welded portion based on the point cloud data and transmits the point cloud data to the inspection control device 3. It should be noted that when the sensor 4 is not attached to the tip end of the welding robot MC1 and is disposed separately from the welding robot MC1, the sensor 4 may include a laser light source (not shown) configured to scan a welded portion of the workpiece Wk (for example, a workpiece or a repair workpiece) based on welded portion position information transmitted from the inspection control device 3, and a camera (not shown) that is disposed in a manner of capable of imaging an imaging region including a periphery of the welded portion and that images a reflection trajectory (that is, shape lines of the welded portion) of reflected laser light among laser light emitted onto the welded portion. In this case, the sensor 4 transmits, to the inspection control device 3, shape data of the welded portion (in other words, image data of the weld bead) based on laser light imaged by the camera. It should be noted that the camera described above includes at least a lens (not shown) and an image sensor (not shown). The image sensor is, for example, a solid-state imaging element such as a charge coupled device (CCD) or a complementary metal oxide semi-conductor (CMOS), and converts an optical image formed on an imaging surface into an electric signal.

(Operation of Welding System)

Figure 3:
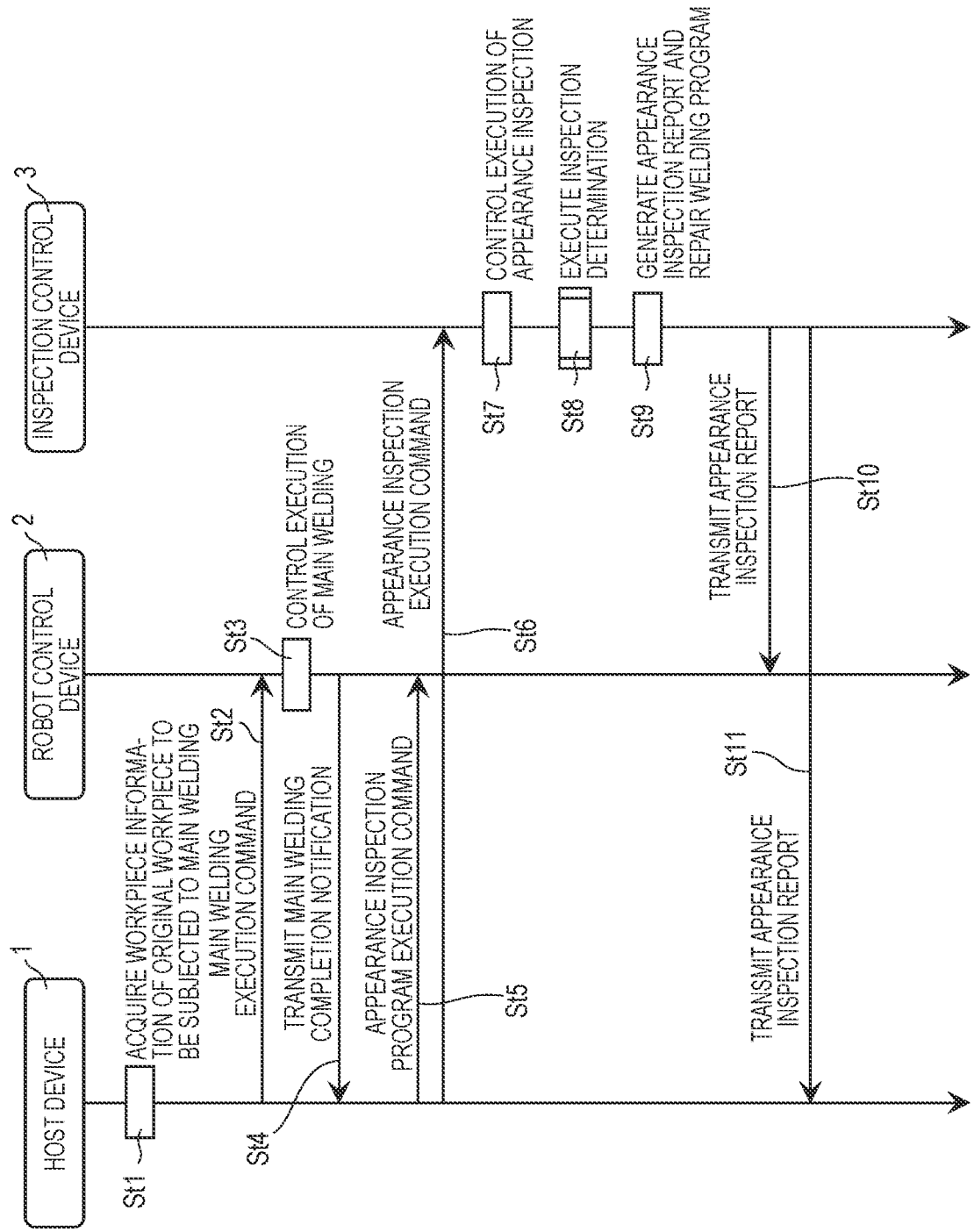
FIG. 3 is a sequence diagram showing an example of a series of processing procedures including main welding and bead appearance inspection that are executed by a welding system according to the embodiment.

Next, a series of operation procedures of the main welding and the bead appearance inspection that are executed by the welding system 100 according to the embodiment will be described with reference to FIG. 3. FIG. 3 is a sequence diagram showing an example of a series of processing procedures including the main welding and the bead appearance inspection that are executed by the welding system 100 according to the embodiment. In the description of FIG. 3, operation procedures executed among the host device 1, the robot control device 2, and the inspection control device 3 for a process of main welding using a plurality of original workpieces, and a process of generating an appearance inspection report including a result of defect determination executed based on a fact that a result of bead appearance inspection of a workpiece is fail and information regarding a position of a defective segment will be described as an example.

In FIG. 3, the host device 1 separately acquires workpiece information of an original workpiece (for example, an ID, a name, and a welded portion of an original workpiece) to be subjected to the main welding (St1), and generates a main welding execution command including the workpiece information of the original workpiece. The host device 1 transmits the main welding execution command including the workpiece information of the original workpiece to the robot control device 2 (St2). It should be noted that the robot control device 2 may execute the processings of step St1 and step St2 without going through the host device 1. In this case, it is preferable that data same as data stored in the external storage ST is stored in the memory 22 of the robot control device 2, or the robot control device 2 is connected to the external storage ST such that the robot control device 2 can acquire data from the external storage ST.

When the robot control device 2 receives the main welding execution command transmitted from the host device 1, the robot control device 2 uses the workpiece information of each of the plurality of original workpieces included in the execution command to create a main welding program for main welding to be executed by the welding robot MC1, and causes the welding robot MC1 to execute the main welding in accordance with the main welding program (St3). When the robot control device 2 determines, by various known methods, that the main welding executed by the welding robot MC1 is completed, the robot control device 2 generates a main welding completion notification indicating that the main welding is completed and transmits the main welding completion notification to the host device 1 (St4). When the host device 1 receives the main welding completion notification, the host device 1 generates an appearance inspection program execution command including an appearance inspection program of a workpiece and transmits the appearance inspection program execution command to the robot control device 2 (St5), and generates a bead appearance inspection execution command of the workpiece and transmit the bead appearance inspection execution command to the inspection control device 3 (St6). The robot control device 2 executes the appearance inspection program received from the host device 1 accompanying with the start of the bead appearance inspection, and moves the sensor 4 attached to the welding robot MC1 along the welding line (St7). The sensor 4 acquires point cloud data that can specify a three-dimensional shape of the workpiece while the sensor 4 is moved by the robot control device 2 so as to be able to scan a welded portion of the workpiece (St7).

The inspection control device 3 uses, as the input data, the point cloud data that can specify a three-dimensional shape of the weld bead acquired by the sensor 4, and executes the bead appearance inspection described above (St8). The inspection control device 3 acquires the main welding program from the robot control device 2, and executes inspection determination (that is, defect determination and defective segment determination) in the bead appearance inspection of the weld bead of the workpiece (St8). It should be noted that details of the processing in step St8 will be described later with reference to FIG. 4 to FIG. 10.

When the inspection control device 3 determines that there is a defect in the workpiece by the defect determination as the inspection determination result of step St8 (St8), the inspection control device 3 determines (detects) a defective segment for each defective portion for repair welding of the defective portion based on information regarding a welding direction in which the workpiece is produced, and generates an appearance inspection report including a defect determination result and information regarding a position of the defective segment for each defective portion (St9). On the other hand, when the inspection control device 3 determines that there is no defect in the workpiece by the defect determination as the inspection determination result of step St8 (St8), the inspection control device 3 generates an appearance inspection report including an inspection determination result indicating that a result of the bead appearance inspection is successful (St9).

Accordingly, the inspection control device 3 can acquire information regarding the welding direction when the main welding is executed. The inspection control device 3 generates an appearance inspection report including the inspection determination result executed in step St8, and transmits the appearance inspection report to the robot control device 2 (St10). In addition, the inspection control device 3 also transmits the appearance inspection report generated in the same manner to the host device 1 (St11).

Figure 4:
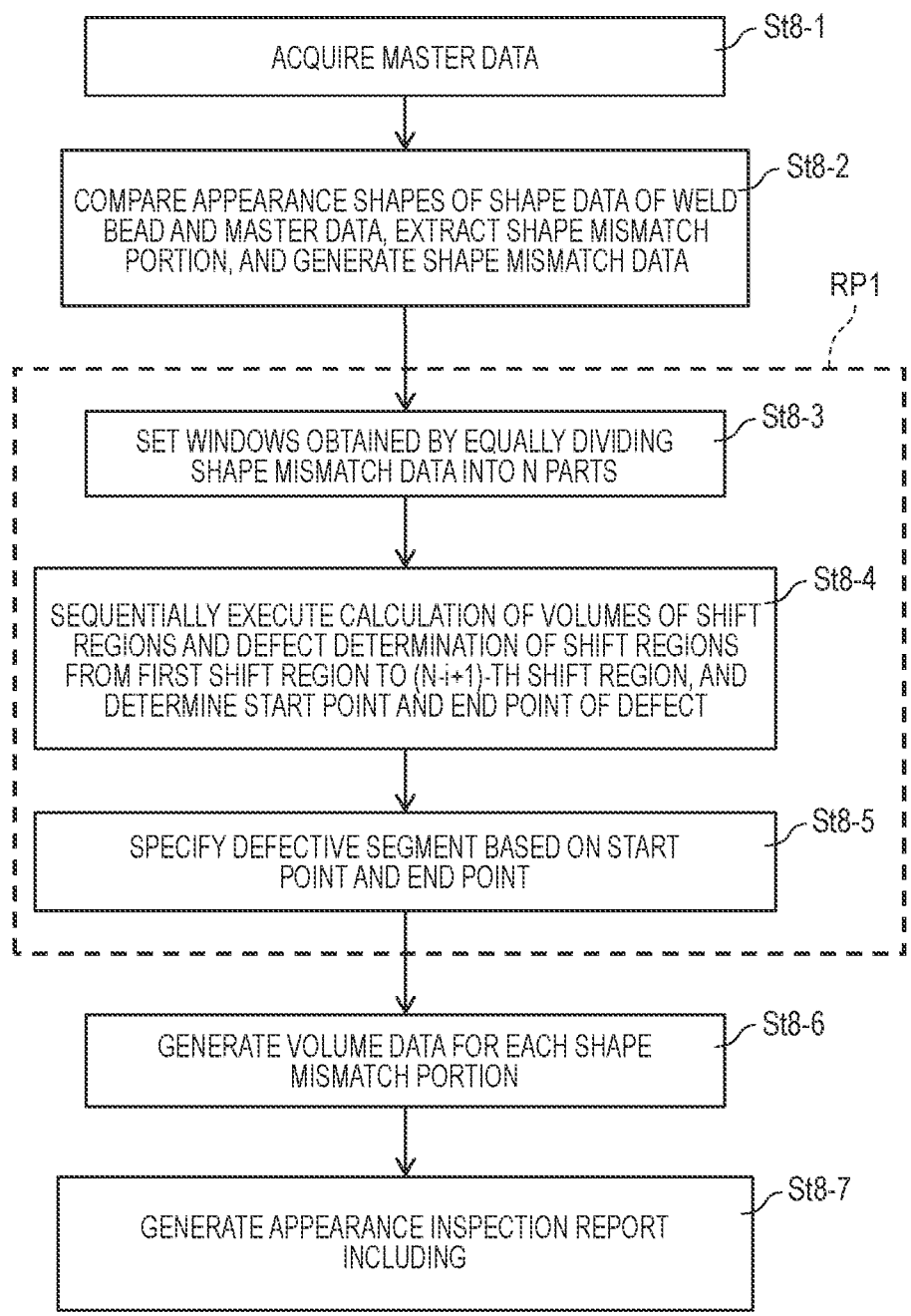
FIG. 4 is a flowchart showing an example of processing procedures of defect determination and defective segment determination (detection) according to the embodiment.

Next, details of a processing of executing defect determination and defective segment determination (detection) as the inspection determination executed in step St8 of FIG. 3 will be described with reference to FIG. 4 to FIG. 10. FIG. 4 is a flowchart showing an example of processing procedures of the defect determination and the defective segment determination (detection) according to the embodiment.

Point cloud data that can specify a three-dimensional shape of a weld bead B1 acquired by the sensor 4 is used for the bead appearance inspection. The data processing unit 36 converts the point cloud data from the sensor 4 into a data format suitable for the bead appearance inspection (for example, image data representing the three-dimensional shape of the weld bead) and passes the converted data to the data processing unit 36. The data processing unit 36 reads out and acquires master data MD1 of a non-defective workpiece (for example, image data representing an ideal three-dimensional shape of a weld bead of the non-defective workpiece) stored in the memory 32 (St8-1).

Figure 5:
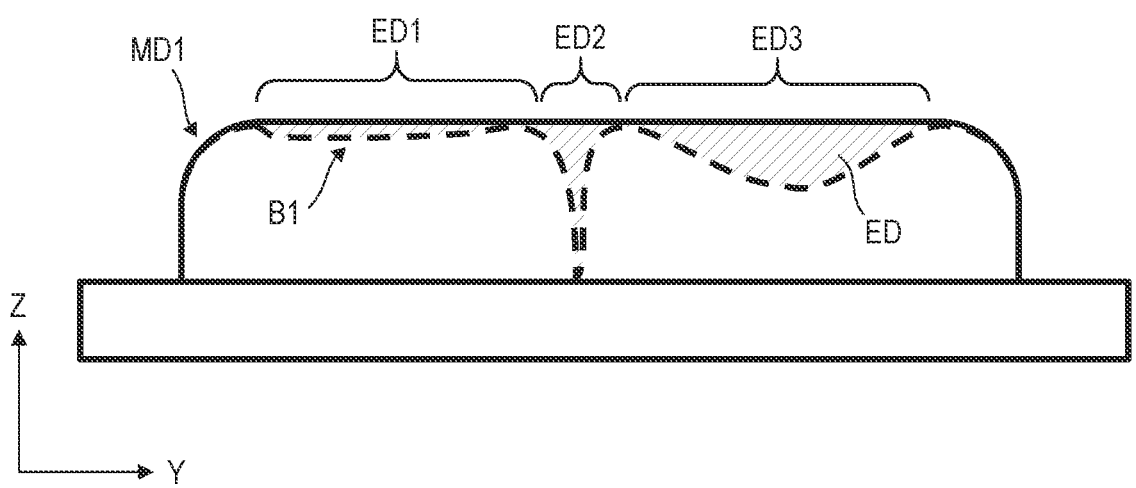
FIG. 5 is a diagram showing an example of shape mismatch portions between a weld bead and master data.
Figure 6:
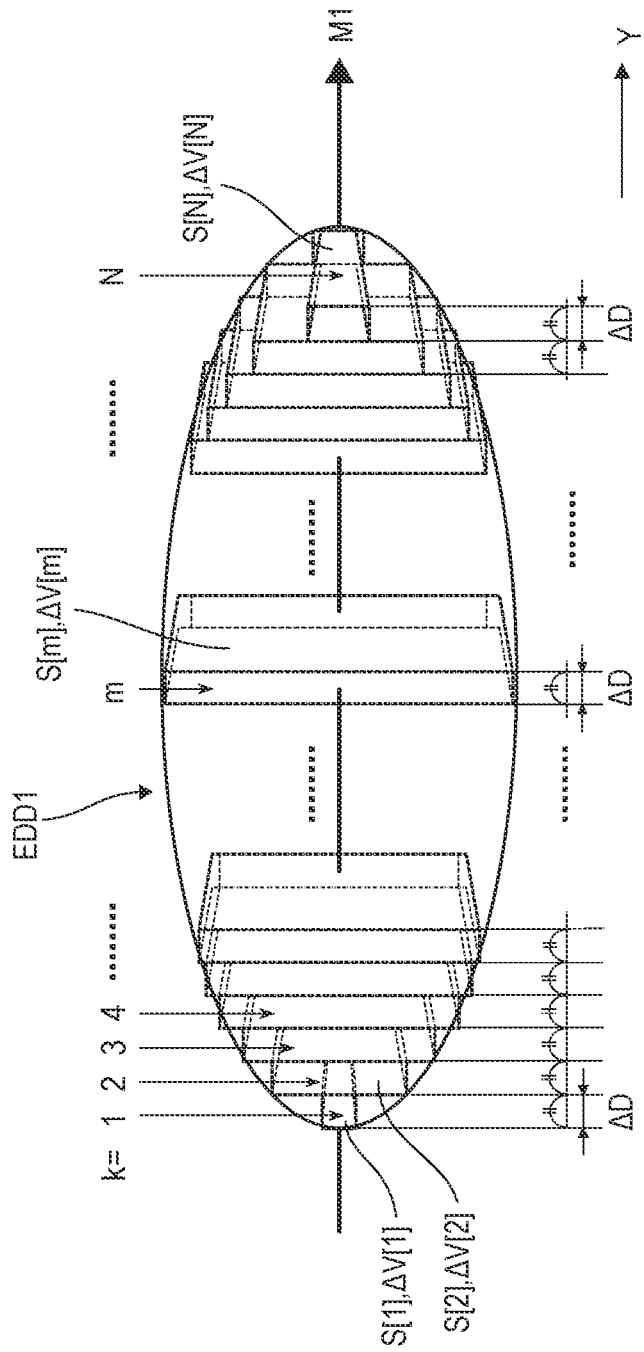
FIG. 6 is a diagram illustrating an example of windows when shape mismatch data is equally divided into N parts.

The data processing unit 36 compares image data RT1 (data to be inspected) from the data processing unit 36 with the master data MD1, and extracts a shape mismatch portion where shapes do not match (for example, each of shape mismatch portions ED1, ED2, and ED3 shown in FIG. 5). The data processing unit 36 generates shape mismatch data EDD1 (see FIG. 6) of the weld bead B1 based on each of the extracted shape mismatch portions ED1 to ED3 (St8-2). It should be noted that in order to simplify the explanation, the shape mismatch data EDD1 shown in FIG. 6 is an example of shape mismatch data generated including each of the plurality of shape mismatch portions ED1 to ED3. However, the shape mismatch data EDD1 is not limited to the above example, and for example, a piece of shape mismatch data may be generated for each shape mismatch portion.

Here, the weld bead B1 and the master data MD1 will be described with reference to FIG. 5. FIG. 5 is a diagram showing an example of the shape mismatch portions ED1, ED2, and ED3 between the weld bead B1 and the master data MD1. In FIG. 5, the master data MD1 is indicated by a solid line, the weld bead B1 is indicated by a dashed line, and a shape mismatch region ED where the shape of the weld bead B1 and the shape in the master data MD1 do not match is indicated by an oblique line. As shown in FIG. 5, the data processing unit 36 compares the shape of the weld bead B1 with the master data MD1, and separately extracts the shape mismatch portions ED1, ED2, and ED3. It should be noted that the weld bead B1, the master data MD1, and the shape mismatch portions ED1 to ED3 shown in FIG. 5 are examples, and it is needless to say that the present invention is not limited thereto.

Figure 7:
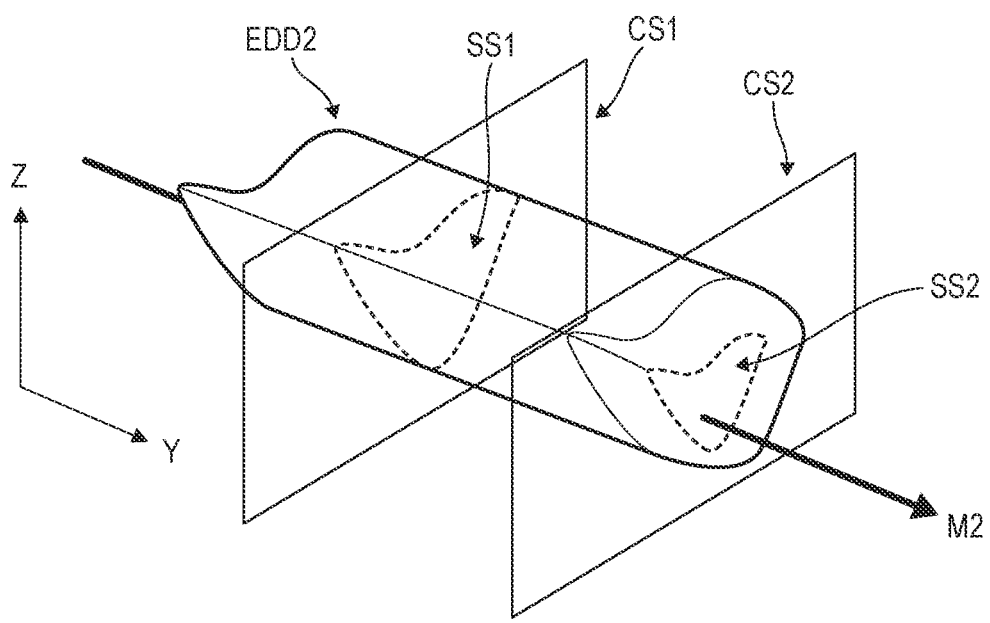
FIG. 7 is a diagram showing an example of a cross-sectional view of shape mismatch data in a direction perpendicular to a welding direction of the shape mismatch data.

Next, an example of shape mismatch data and windows used for a defect determination processing in the present embodiment will be described with reference to FIG. 6 and FIG. 7. FIG. 6 is a diagram illustrating an example of windows ΔV[1], ΔV[2], ..., ΔV[m], ..., ΔV[N] when the shape mismatch data EDD1 is equally divided into N parts. FIG. 7 is a diagram showing an example of a cross-sectional view of shape mismatch data EDD2 in a direction perpendicular to a welding direction of the shape mismatch data EDD2. It should be noted that the shape mismatch data EDD1 shown in FIG. 6 is shape mismatch data generated based on the shape mismatch portions ED1 to ED3 shown in FIG. 5, and is a diagram viewed from a Z direction. In addition, FIG. 7 shows a cross section SS1 when the shape mismatch data EDD2 is cut along a cut surface CS1 in a direction perpendicular to a welding direction M2, and a cross section SS2 when the shape mismatch data EDD2 is cut along a cut surface CS2.

The data processing unit 36 acquires information regarding a welding direction M1 in which the weld bead B1 is produced, and sets N windows ΔV[1], ΔV[2], ..., ΔV[m], ..., ΔV[N] (N: an integer of 2 or more) obtained by equally dividing the shape mismatch data EDD1 into N parts at an equal interval ΔD in a direction perpendicular to the welding direction M1 (St8-3). Here, a window ΔV[k] shows a volume calculated by multiplying, by the interval ΔD, the k-th (k: an integer of 1 or more) cross-sectional area S[k] among the N equally divided windows of the shape mismatch data EDD1.

It should be noted that although an example in which the cross-sectional area S[k] shown in FIG. 6 is calculated by approximating a cross section of the shape mismatch data EDD1 by a rectangle is shown, the present invention is not limited thereto. For example, the cross-sectional area S[k] may be calculated by calculating an area of each of the cross sections SS1 and SS2 as shown in FIG. 7, and may be calculated based on an approximate shape obtained by approximating each of the cross sections SS1 and SS2 to any polygon.

Further, here, either the interval ΔD or the number N of windows (that is, the number of windows) obtained by cutting the shape mismatch data EDD1 may be set as a fixed value. It should be noted that regarding a length of the interval ΔD, any length preset based on a quality standard required by the user may be set by an operator, and a length based on a total length of the shape mismatch data EDD1 in the welding direction M1 (for example, when the total length of the shape mismatch data EDD1 is 50 mm or more, ΔD=5 mm, or when the total length is 100 mm or more, ΔD=10 mm) may be set. Similarly, regarding the number of windows N, any number based on the quality standard required by the user may be set by the operator, and a number preset based on the total length of the shape mismatch data EDD1 in the welding direction M1 (for example, when the total length of the shape mismatch data EDD1 is 50 mm or more, N=5, or when the total length is 100 mm or more, N=10) may be set.

Figure 8:
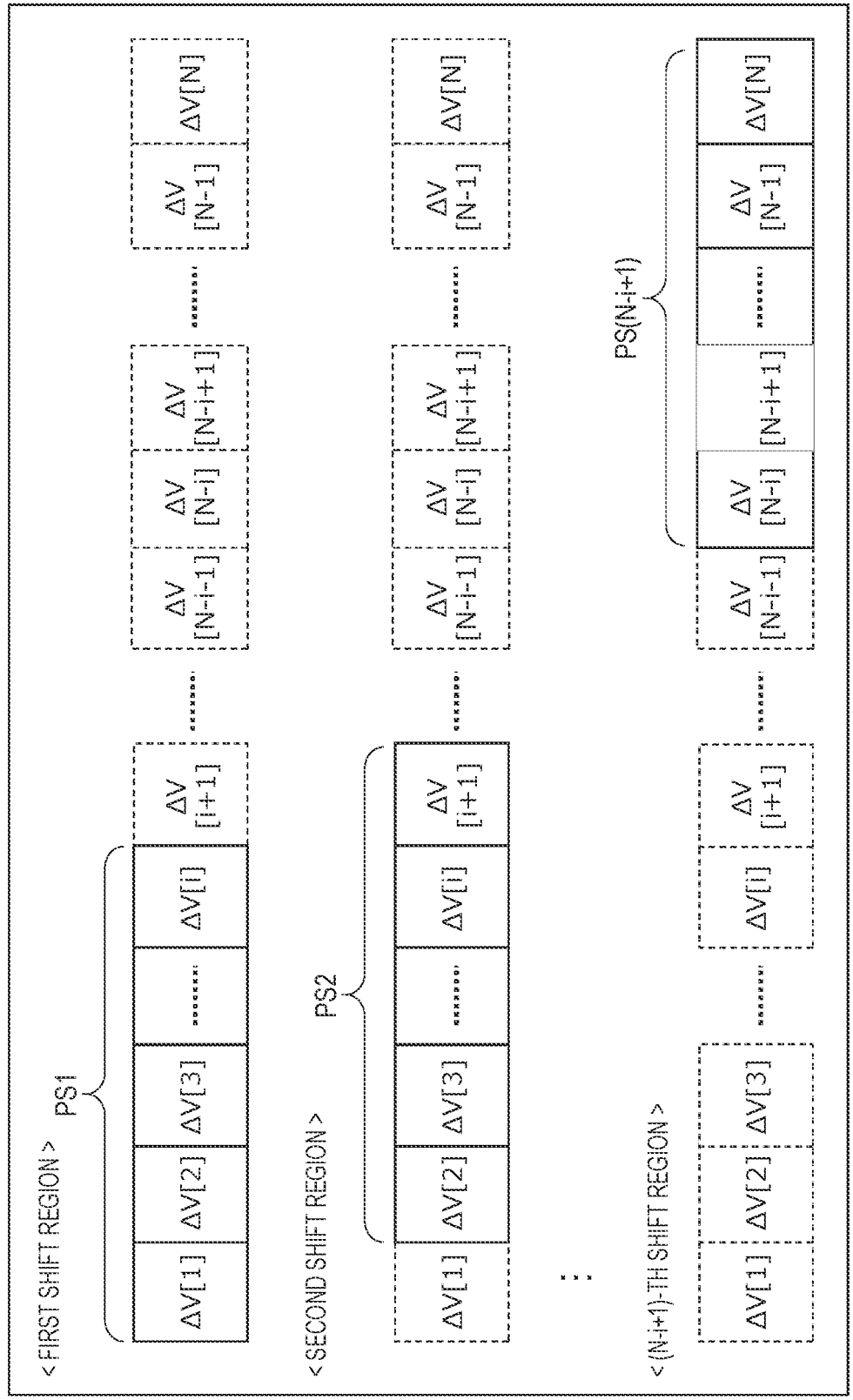
FIG. 8 is a diagram illustrating an example of shift regions and shift operations of the shift regions.

The data processing unit 36 sets (N−i+1) (i: an integer of 1 or more) shift regions PS1, PS2, ..., PS(N−i+1) (see FIG. 8) formed by i continuous windows among the N respective windows ΔV[1], ..., ΔV[N] (St8-4). Here, the shift regions PS1, PS2, ..., PS(N−i+1) will be described with reference to FIG. 8. FIG. 8 is a diagram illustrating an example of the shift regions PS1, PS2, ..., PS(N−i+1) and shift operations of the shift regions.

As shown in FIG. 8, each of the shift regions PS1, PS2, ..., PS(N−i+1) is formed by i windows. The i windows forming each of the shift regions PS1, PS2, ..., PS(N−i+1) are different in that a window number k is shifted one by one in the welding direction M1. Specifically, the shift region PS1 is formed by i windows from the window ΔV[1] to the window ΔV[i]. The shift region PS2 is formed by i windows from the window ΔV[2] to the window ΔV[i+1] by shifting the i windows forming the shift region PS1 one by one in welding direction M1. In addition, similarly, the shift region PS(N−i+1) is formed by i windows from the window ΔV[N−i] to the window ΔV[N]. It should be noted that regarding the number of windows i forming one shift region, any value of 1 or more may be set by the operator based on a quality standard for each user.

The data processing unit 36 calculates a volume of each of the shift regions, and determines whether the calculated volume of the shift region is equal to or larger than the threshold stored in the determination threshold storage unit 34 (St8-4). When the data processing unit 36 determines that the volume of the shift region is equal to or larger than the threshold, the data processing unit 36 determines that the shift region is a defective portion that requires repair welding (St8-4). From the first shift region PS1 to the (N−i+1)-th shift region PS(N−i+1) among the (N−i+1) shift regions PS1, PS2, ..., PS(N−i+1), the data processing unit 36 sequentially executes the calculation of the volumes of the (N−i+1) respective shift regions and the defect determination described above, and sequentially determines a start point and an end point of a defective segment based on a result of the defect determination (St8-4). Accordingly, the data processing unit 36 can more accurately determine for each shift region, based on a volume of a shape mismatch portion per reference length (that is, the interval ΔD), whether there is a defect that does not satisfy the quality standard of the user and is to be repair welded, and determines, based on the shift region determined as the defective portion, a start point and an end point of the defective segment to be repair welded (St8-4). Hereinafter, a determination processing method of the start point and the end point will be described.

When the data processing unit 36 determines that a calculated volume of the k-th shift region is defective, the data processing unit 36 determines whether a previous (that is, the (k−1)-th) shift region is non-defective. When the data processing unit 36 determines that the previous shift region is non-defective and the volume of the k-th shift region is defective, the data processing unit 36 determines any position in the k-th shift region as the start point of the defective segment. It should be noted that when the data processing unit 36 determines that the first (that is, k=1) shift region is defective, the data processing unit 36 determines any position in the first shift region as the start point of the defective segment.

In addition, after the data processing unit 36 determines the start point, when the data processing unit 36 determines that the calculated volume of the k-th shift region is defective and the (k+1)-th shift region is non-defective, the data processing unit 36 determines any position in the k-th shift region as the end point of the defective segment. It should be noted that when the data processing unit 36 determines that the (N−1)-th (that is, k=N−1) shift region is defective and the N-th (that is, k+1=N) shift region is defective, the data processing unit 36 determines any position in the N-th shift region as the end point of the defective segment.

It should be noted that when the data processing unit 36 determines that one discontinuous shift region is the defective portion, the data processing unit 36 may determine, as the start point of the defective segment, the first window among i windows forming the shift region, and may determine the i-th window among the i windows as the end point of the defective segment.

Further, the data processing unit 36 may determine that the start point and the end point of the defective segment are the same point when a center of one discontinuous shift region is used. Thus, when the start point and the end point of the defective segment are the same point, the repair welding program creation unit 37 generates a repair welding program for repair welding of the defective segment (same point) by, for example, spot welding, and causes the welding robot MC1 to execute the repair welding by spot welding.

In addition, another determination processing method of the start point and the end point will be described. When the data processing unit 36 determines that two or more continuous shift regions are the defective portion, the data processing unit 36 may determine, as the start point of the defective segment, the first window among the i windows forming a shift region firstly determined as the defective portion among the two or more continuous shift regions, or a center of the shift region. In addition, similarly, when the data processing unit 36 determines that two or more continuous shift regions are the defective portion, the data processing unit 36 may determine, as the end point of the defective segment, the i-th window among the i windows forming a shift region last determined as the defective portion among the two or more continuous shift regions, or a center of the shift region. It should be noted that the center of the shift region may be a center position of the shift region, or may be the i/2-th window among the i windows.

Further, when the shift region firstly determined as the defective portion among the two or more continuous shift regions is the first shift region PS1, the data processing unit 36 may determine the first window among the i windows as the start point of the defective segment. In addition, when the shift region last determined as the defective portion among the two or more continuous shift regions is the (N−i+1)-th shift region PS(N−i+1), the data processing unit 36 may determine the i-th window among the i windows as the end point of the defective segment. Accordingly, in the defect determination based on a volume of a shape mismatch portion per reference length (that is, the interval ΔD), the data processing unit 36 can determine (detect) a defective segment that can prevent an oversight in repair welding for a defect in the first shift region PS1 and the (N−i+1)-th shift region PS(N−i+1) where it is difficult to specify a position of a defect to be repair welded.

The data processing unit 36 specifies (detects) the defective segment of each defective portion based on the determined start point and end point (St8-5). It should be noted that regarding the defective portion referred to herein, a plurality of continuous defective portions are regarded as one defective portion.

Figure 9:
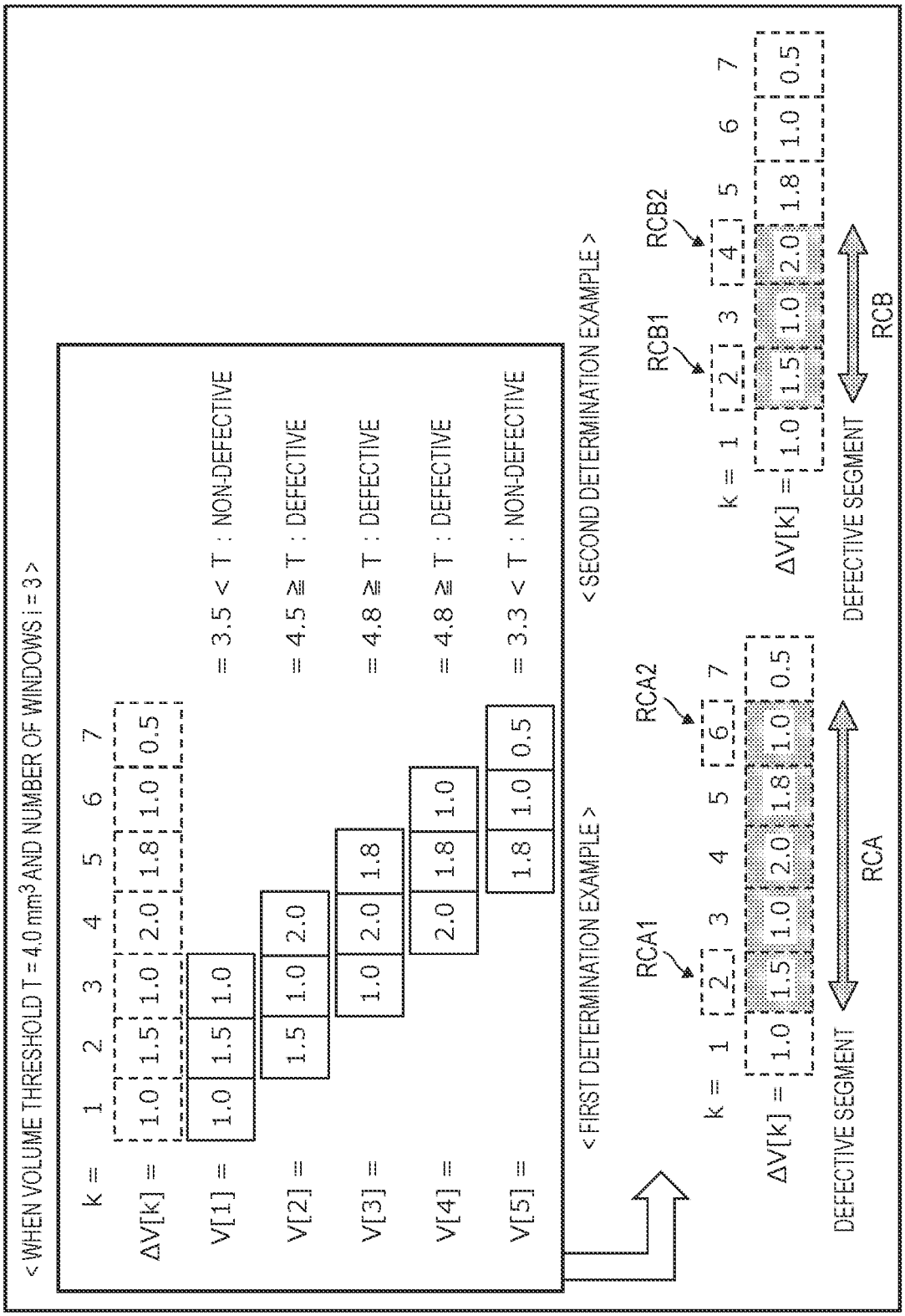
FIG. 9 is a diagram illustrating determination examples of defect determination and determination of a start point and an end point of a defective segment according to the embodiment.

Here, the processings executed in step St8-4 and step St8-5 will be described in detail with reference to FIG. 9 by using a specific example. FIG. 9 is a diagram illustrating determination examples of defect determination and determination of a defective segment according to the embodiment. It should be noted that FIG. 9 shows determination examples when the shape mismatch data is equally divided into 7 parts (that is, N=7), the number of windows i=3, and a volume threshold T=4.0 mm3.

In addition, in the determination of the start point and the end point of the defective segment shown in FIG. 9, although two examples including the first determination example in which the first window among three windows forming the first shift region determined to be defective is determined as a start point of the defective segment, and the third window among three windows forming the last shift region is determined as an end point of the defective segment, and the second determination example in which the first window (that is, the integer number-th of i=3/2) as a center position of three windows forming the first shift region determined to be defective is determined as a start point of the defective segment, and the first window (that is, the integer number-th of i=3/2) as a center position of three windows forming the last shift region is determined as an end point of the defective segment are shown, it is needless to say that the present invention is not limited thereto. For example, regarding the center position in the second determination example, the data processing unit 36 may determine the second window among the three windows as the center position.

A volume of the k-th shift region V[k] is a total value of a volume of a window ΔV[k], a volume of a window ΔV[k+1], and a volume of a window ΔV[k+2]. The data processing unit 36 calculates a volume of the first shift region V[1], and determines that the first shift region V[1] is a non-defective portion since the calculated volume of the first shift region V[1] of 3.5 mm3 is not equal to or larger than the threshold T=4.0 mm3.

The data processing unit 36 calculates a volume of the second shift region V[2], and determines that the second shift region V[2] is a defective portion since the calculated volume of the second shift region V[2] of 4.5 mm3 is equal to or larger than the threshold T=4.0 mm3. Since the previous shift region (that is, the first shift region V[1]) is a non-defective portion, the data processing unit 36 executes determination of a start point of a defective segment in the second shift region V[2]. Specifically, in the first determination example, the data processing unit 36 determines, as a start point RCA1 of a defective segment RCA in the defective portion, the first window ΔV[2] among three windows forming the second shift region V[2], and in the second determination example, the data processing unit 36 determines, as a start point RCB1 of a defective segment RCB in the defective portion, a window ΔV[2] at a center position of three windows forming the second shift region V[2].

The data processing unit 36 calculates a volume of the third shift region V[3], and determines that the third shift region V[3] is a defective portion since the calculated volume of the third shift region V[3] of 4.8 mm3 is equal to or larger than the threshold T=4.0 mm3. Since the previous shift region (that is, the second shift region V[2]) is a defective portion, the data processing unit 36 omits determination of the end point of the defective segment. Similarly, the data processing unit 36 calculates a volume of the fourth shift region V[4], and determines that the fourth shift region V[4] is a defective portion since the calculated volume of the fourth shift region V[4] of 4.8 mm3 is equal to or larger than the threshold T=4.0 mm3. Since the previous shift region (that is, the third shift region V[3]) is a defective portion, the data processing unit 36 omits determination of the end point of the defective segment.

The data processing unit 36 calculates a volume of the fifth shift region V[5], and determines that the fifth shift region V[5] is a non-defective portion since the calculated volume of the fifth shift region V[5] of 3.3 mm3 is not equal to or larger than the threshold T=4.0 mm3. Since the previous shift region (that is, the fourth shift region V[4]) is a defective portion and the fifth shift region V[5] is a non-defective portion, the data processing unit 36 executes determination of an end point of the defective segment in the fourth shift region V[4]. Specifically, in the first determination example, the data processing unit 36 determines, as an end point RCA2 of the defective segment RCA in the defective portion, the third window ΔV[6] among three windows forming the fourth shift region V[4], and in the second determination example, the data processing unit 36 determines, as an end point RCB2 of the defective segment RCB in the defective portion, a window ΔV[4] at a center position of three windows forming the fourth shift region V[4].

As described above, in the first determination example, the data processing unit 36 shown in FIG. 9 determines, as the defective segment RCA, a segment from a position of the start point RCA1 (that is, the window ΔV[2]) to a position of the end point RCA2 (that is, the window ΔV[6]), and in the second determination example, the data processing unit 36 determines, as the defective segment RCB, a segment from a position of the start point RCB1 (that is, the window ΔV[2]) to a position of the end point RCB2 (that is, the window ΔV[4]).

The data processing unit 36 repeatedly executes a repeat processing RPI from step St8-3 to step St8-5 for each shape mismatch portion, and generates volume data (see FIG. 10) of a weld bead lacking in each defective segment. (St8-6). It should be noted that the processing of step St8-6 is not essential and may be omitted.

Figure 10:
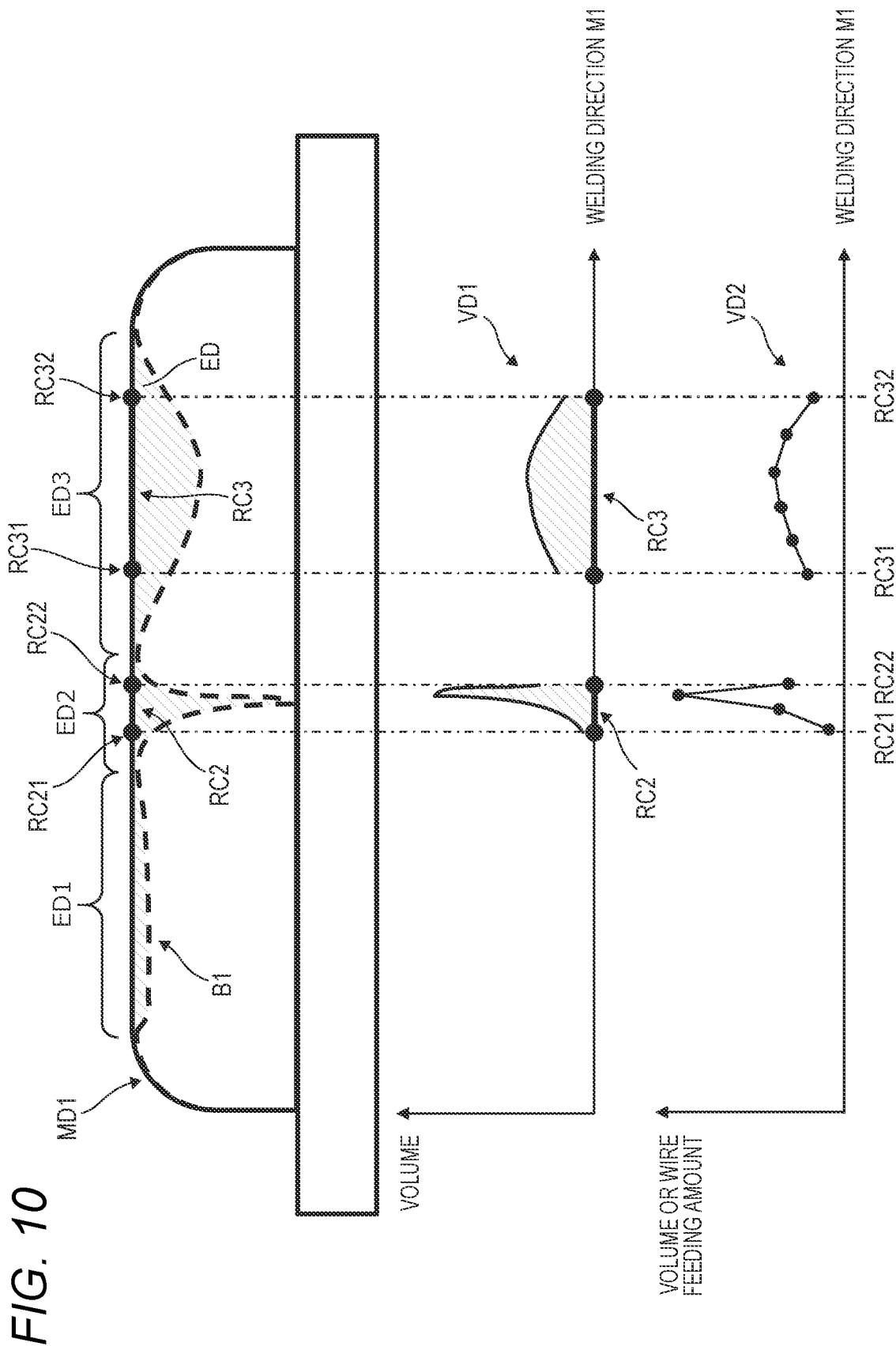
FIG. 10 is a diagram showing an example of volume data of defect mismatch portions and defective segments of the weld bead.

Here, volume data VD1 will be described with reference to FIG. 10. FIG. 10 is a diagram showing an example of the volume data VD1 of the shape mismatch portions ED2 and ED3 and defective segments RC2 and RC3 of the weld bead B1. It should be noted that an example in which the weld bead B1 shown in FIG. 10 has three respective shape mismatch portions ED1, ED2, and ED3, and two shape mismatch portions ED2 and ED3 among the three respective shape mismatch portions ED1, ED2, and ED3 are determined to be defective by the data processing unit 36 is shown. In addition, in the example shown in FIG. 10, the data processing unit 36 determines a segment from a start point RC21 to an end point RC22 as the defective segment RC2 of the shape mismatch portion ED2, and determines a segment from a start point RC31 to an end point RC32 as the defective segment RC3 of the shape mismatch portion ED3.

The data processing unit 36 generates the volume data VD1 obtained by extracting, from shape mismatch data (not shown) generated by extracting the shape mismatch region ED from the total length of the weld bead B1, volumes of weld beads lacking in the defective segment RC2 and the defective segment RC3 in the welding direction M1. Here, the data processing unit 36 may generate repair welding condition data VD2 obtained by plotting volume values at positions corresponding to respective positions of a plurality of windows included in the respective defective segments RC2 and RC3 in the generated volume data VD1, it should be noted that the repair welding condition data VD2 is not simply limited to data obtained by approximating the volume values, and the data processing unit 36 may generate, based on, for example, the volume data VD1, data indicating a feeding amount of the welding wire 301 for repair welding of the respective defective segments RC2 and RC3, data indicating a welding current value or a welding voltage value of the power supply device 500 for controlling the welding torch 400 for repair welding of the respective defective segments RC2 and RC3, as examples of the welding condition.

The data processing unit 36 generates notification information for notifying whether there is a defect as an inspection determination result (that is, whether repair welding is necessary), and an appearance inspection report including at least information regarding a defective segment for each shape mismatch portion (St8-7). It should be noted that when volume data or repair welding condition data is generated in step St8-6, the data processing unit 36 generates an appearance inspection report further including the generated volume data or repair welding condition data.

As described above, the inspection control device 3 according to the embodiment can more accurately determine whether there is a shape mismatch (defect) that requires repair welding at the shape mismatch portion based on the comparison between the appearance shape of the weld bead and the master data of the non-defective workpiece, and can more appropriately determine (detect) a repair welding segment (defective segment) that requires repair welding, and thus, unnecessary repair welding can be efficiently reduced. In addition, since the inspection control device 3 can set, based on the welding quality standard required by the user, a shift region used for defect determination, usability in determining whether there is a defect that requires repair welding and in determining (detecting) a repair welding segment (defective segment) can be improved.

For example, when the number of windows i forming a shift region is set to a small value, the operator can more accurately determine the presence or absence of a defect that requires repair welding, and can shorten the repair welding segment (defective segment) obtained by the determination. On the other hand, when the number of windows i forming a shift region is set to a value equal to or larger than i=2, the operator can further prevent erroneous defect determination due to influence of noise included in the appearance shape of the weld bead acquired by the sensor 4, and can reduce a processing load caused by processings of the defect determination and the defective segment determination. In addition, such an effect can be similarly achieved by adjusting not only the value of the number of windows i forming a shift region, but also the value of the interval ΔD indicating a width of a window in the welding direction.

(Modification of Embodiment)

An example according to the embodiment described above in which the inspection control device 3 executes defect determination and defective segment determination (detection) for each defect based on a threshold for any volume stored in the determination threshold storage unit 34 is shown. An example according to a modification of the embodiment in which the inspection control device 3 executes defect determination and defective segment determination (detection) for each defect based on the first threshold for any volume stored in the determination threshold storage unit 34 and the second threshold based on the first threshold is described.

It should be noted that processing procedures of the defect determination and the defective segment determination (detection) according to the modification of the embodiment are different from the example of processing procedures of the defect determination and the defective segment determination (detection) according to the embodiment shown in FIG. 4 in the processing of step St8-4. Therefore, in the following description regarding the processing procedures of the defect determination and the defective segment determination (detection) according to the modification of the embodiment, a processing of step St8-4 will be described, and description of other processing procedures will be omitted.

According to the modification of the embodiment, the inspection control device 3 stores, in the determination threshold storage unit 34, the first threshold T1 (the first threshold T1 referred to herein is the same as the threshold used for defect determination in the embodiment) used for defect determination and a dead zone width Z (0<Z<1) used to calculate the second threshold T2 used for determination of an end point of a defective segment. The second threshold T2 is calculated by multiplying the first threshold T1 by (1−Z). It should be noted that the dead zone width Z may be a value indicated by percentage.

It should be noted that as the dead zone width Z, a predetermined relative value may be set with respect to the first threshold, or a specified value (constant value) may be set. For example, the dead zone width Z may be set to Z=2.0 mm3 when the first threshold ≥10.0 mm3, Z=1.0 mm3 when the first threshold <10.0 mm3, etc., and may be set to Z=2.0 mm3 as a specified value regardless of the value of the first threshold.

As described above, according to the modification of the embodiment, the inspection control device 3 changes a threshold (first threshold T1) used for determination of a start point of a defective segment and a threshold (second threshold T2) used for determination of an end point of the defective segment. Here, the second threshold T2 is a volume value smaller than the first threshold T1. Accordingly, according to the modification of the embodiment, when the start point is determined in determination of a defective segment (repair welding segment) to be repair welded, the inspection control device 3 can tighten a criterion for determining to be non-defective (end of a defect) in defect determination of continuous shift regions. That is, since the inspection control device 3 determines that the defective segment does not end when a volume of the shift region (in other words, a volume difference between an appearance shape of a weld bead and master data) is not equal to or smaller than the changed second threshold T2, the inspection control device 3 can determine (detect) a defective segment, which can further prevent occurrence of an oversight in repair in repair welding to be executed based on the generated information regarding the defective segment.

Figure 11:
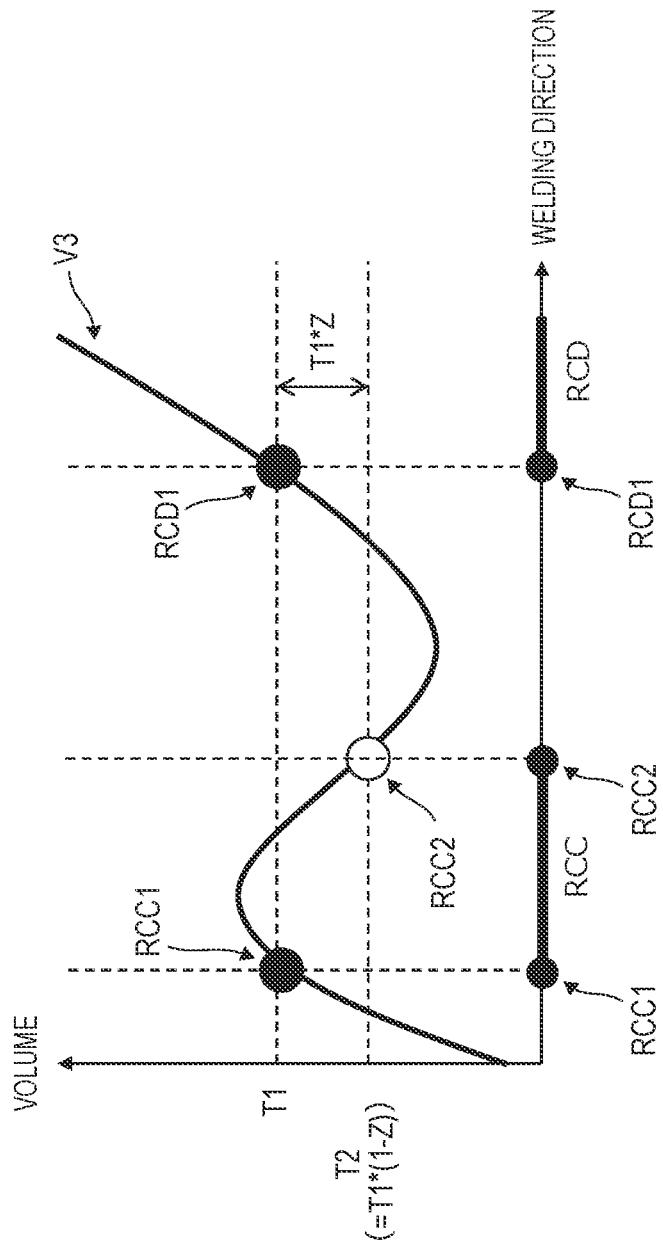
FIG. 11 is a diagram illustrating processings of defect determination and defective segment determination according to a modification of the embodiment.

The processings of the defect determination and the defective segment determination (detection) according to the modification of the embodiment will be described with reference to FIG. 11. FIG. 11 is a diagram illustrating the determination of the start point and the end point of the defective segment according to the modification of the embodiment. A volume graph V3 shown in FIG. 11 is a graph obtained by plotting respective volumes of a plurality of shift regions calculated by the data processing unit 36.

The first threshold T1 is a threshold used for determination of the start point of the defective segment according to the modification of the embodiment. The second threshold T2 is a threshold used for determination of the end point of the defective segment according to the modification of the embodiment. A difference between the first threshold T1 and the second threshold T2 is a value obtained by multiplying the dead zone width Z by the first threshold T1.

The data processing unit 36 calculates the volume of the shift region, and determines whether the calculated volume of the shift region is equal to or larger than the first threshold T1 for the volume stored in the memory 32 (that is, determination of a start point of a defective segment RCC). When the data processing unit 36 determines that the calculated volume of the shift region is equal to or larger than the first threshold T1 (for example, a point RCC1 shown in FIG. 11), the data processing unit 36 determines that the shift region is a defective portion that requires repair welding, and executes determination of a start point of the defective portion.

After the data processing unit 36 determines that the start point of the defective portion is a position indicated by the point RCC1, the data processing unit 36 changes a threshold used for defect determination of shift regions continuous in the welding direction (that is, determination of an end point of the defective segment RCC) from the first threshold T1 to the second threshold T2.

When the data processing unit 36 determines that the calculated volume of the shift region is equal to or smaller than the second threshold T2 (for example, a point RCC2 shown in FIG. 11), the data processing unit 36 determines that the shift region is a non-defective portion, and executes determination of an end point of the defective segment from a shift region determined to be a non-defective portion.

After the data processing unit 36 determines that the end point of the defective segment is a position indicated by the point RCC2, the data processing unit 36 changes the threshold used for defect determination of shift regions continuous in the welding direction (that is, determination of a start point of a defective segment RCD) from the second threshold T2 to the first threshold T1, and shifts windows one by one along the welding direction and sequentially executes the defect determination for each shift region.

When the data processing unit 36 determines that the calculated volume of the shift region is equal to or larger than the first threshold T1 (for example, a point RCD1 shown in FIG. 11), the data processing unit 36 determines that the shift region is a defective portion that requires repair welding, and executes determination of a start point of the defective portion. After the data processing unit 36 determines that the start point of the defective portion is a position indicated by the point RCD1, the data processing unit 36 changes the threshold used for defect determination of shift regions continuous in the welding direction (that is, determination of an end point of the defective segment RCD) from the first threshold T1 to the second threshold T2. It should be noted that in FIG. 11, the subsequent illustration of the volume graph V3 and description of various determination processings will be omitted.

In this manner, in the modification of the embodiment, the data processing unit 36 changes the volume threshold used for defect determination from the first threshold T1 to the second threshold T2 after determining the start point of the defective segment, changes the volume threshold used for defect determination from the second threshold T2 to the first threshold T1 after determining the end point of the defective segment, and sequentially executes determination of the start point and the end point of the defective segment based on the defect determination described above and results of the defect determination from the first shift region PS1 to the (N−i+1)-th shift region PS(N−i+1) among the (N−i+1) shift regions PS1, PS2, . . . , PS(N−i+1) (St8-4).

It should be noted that since a determination method of the start point in the first shift region determined to be defective and a determination method of the end point in the last shift region determined to be defective are the same as the determination methods shown in the embodiment, the description thereof is omitted.

Figure 13:
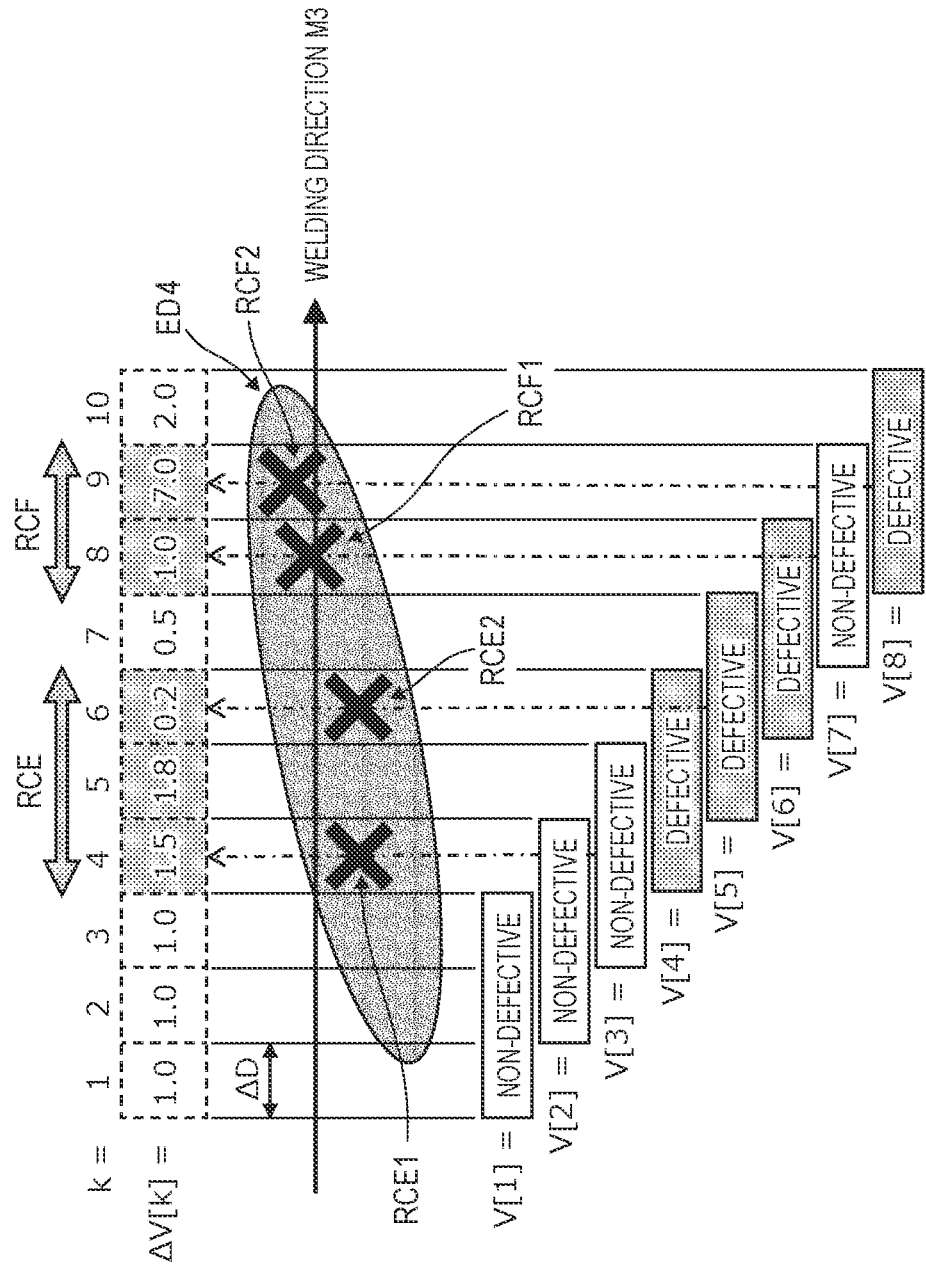
FIG. 13 is a diagram illustrating a determination example of the processings of the defect determination and the defective segment determination according to the modification of the embodiment.
Figure 14:
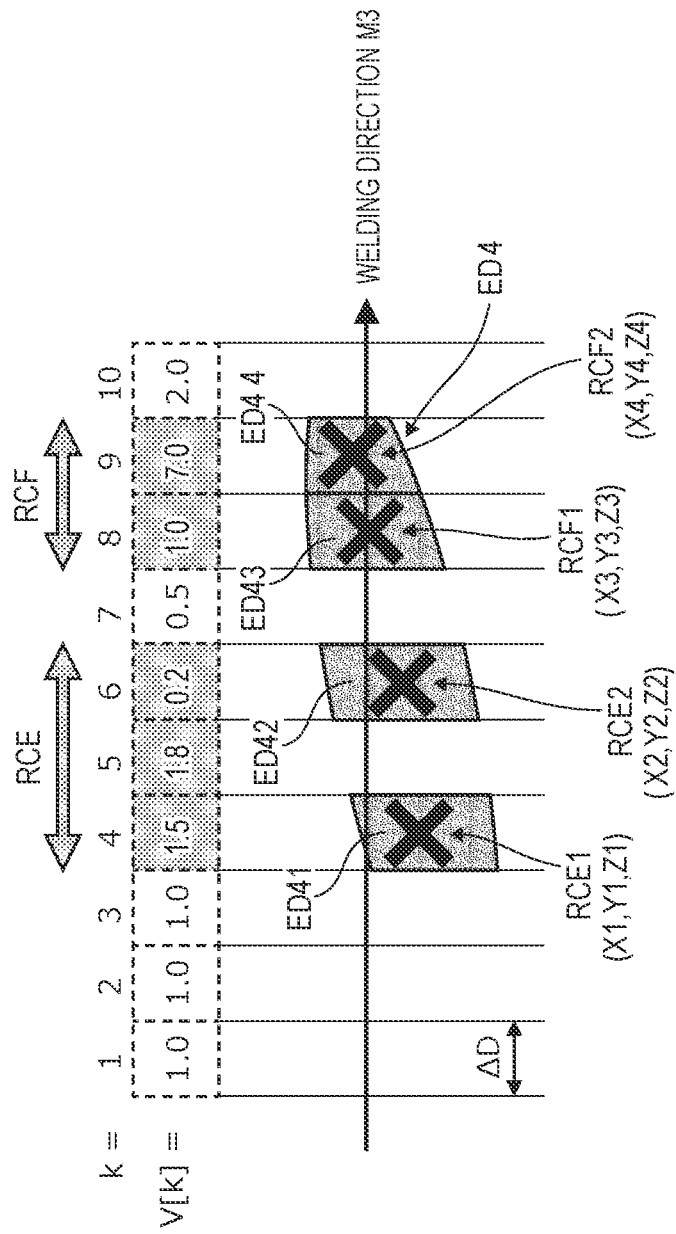
FIG. 14 is a diagram illustrating an example of calculating coordinates of a start point and an end point in a defective segment according to the modification of the embodiment.

Here, a processing example of the defect determination and the defective segment determination, and a processing example of determination of the repair welding start point and the repair welding end point executed in step St8-4 and step St8-5 will be described with reference to FIG. 12 to FIG. 14. FIG. 12 is a diagram illustrating a determination example of a start point and an end point of a defective segment according to the modification of the embodiment. FIG. 13 is a diagram illustrating a determination example of a start point and an end point of a defective segment according to the modification of the embodiment. FIG. 14 is a diagram illustrating an example of calculating coordinates of a start point and an end point in a defective segment according to the modification of the embodiment. It should be noted that in the determination examples of the defect determination and the determination of the start point and the end point of the defective segment shown in FIG. 12, determination examples when shape mismatch data ED4 shown in FIG. 13 is equally divided into 10 parts (that is, N=10), the number of windows i=3, the dead zone width Z=0.2, and the first threshold T1=4.0 mm3. It should be noted that the second threshold T2 shown in FIG. 12 is calculated as T2=3.2 mm3 based on the first threshold T1 and the dead zone width Z.

In addition, in the determination of the start point and the end point of the defective segment shown in FIG. 12, although an example in which the first window (that is, the integer number-th of i=3/2) as a center position of three windows forming the first shift region determined to be defective is determined as a start point, and the first window (that is, the integer number-th of i=3/2) as a center position of three windows forming the last shift region determined to be defective is determined as an end point is shown, it is needless to say that the present invention is not limited thereto.

A volume of the k-th shift region V[k] is a total value of a volume of a window ΔV[k], a volume of a window ΔV[k+1], and a volume of a window ΔV[k+2]. The data processing unit 36 calculates a volume of the first shift region V[1], and determines that the first shift region V[1] is non-defective since the calculated volume of the first shift region V[1] of 3.0 mm3 is equal to or smaller than the first threshold T1=4.0 mm3.

The data processing unit 36 calculates a volume of the second shift region V[2], and determines that the second shift region V[2] is non-defective since the calculated volume of the second shift region V[2] of 3.5 mm3 is equal to or smaller than the first threshold T1=4.0 mm3.

The data processing unit 36 calculates a volume of the third shift region V[3], determines that the third shift region V[3] is defective since the calculated volume of the third shift region V[3] of 4.3 mm3 is equal to or larger than the first threshold T1=4.0 mm3, and executes determination (detection) of a start point of a defective segment in the third shift region V[3] since the previous shift region (that is, the second shift region V[2]) is a non-defective portion. Specifically, the data processing unit 36 determines, as a start point RCE1 of a defective segment RCE in the defect, a window ΔV[4] at a center position of three windows forming the third shift region V[3]. After the data processing unit 36 determines the start point RCE1 of the defective segment RCE, the data processing unit 36 changes a threshold used for defect determination from the first threshold T1 to the second threshold T2.

The data processing unit 36 calculates a volume of the fourth shift region V[4], and determines that the fourth shift region V[4] is defective since the calculated volume of the fourth shift region V[4] of 3.5 mm3 is not equal to or smaller than the second threshold T2=3.2 mm3.

The data processing unit 36 calculates a volume of the fifth shift region V[5], determines that the fifth shift region V[5] is non-defective since the calculated volume of the fifth shift region V[5] of 2.5 mm3 is equal to or smaller than the second threshold T2=3.2 mm3, and executes determination (detection) of an end point of the defective segment from the fifth shift region V[5] since the previous shift region (that is, the fourth shift region V[4]) is defective. Specifically, the data processing unit 36 determines, as an end point RCE2 of the defective segment RCE in the defect, a window ΔV[6] at a center position of three windows forming the fifth shift region V[5]. After the data processing unit 36 determines the end point RCE2 of the defective segment RCE, the data processing unit 36 changes a threshold used for defect determination from the second threshold T2 to the first threshold T1.

The data processing unit 36 calculates a volume of the sixth shift region V[6] and determines that the sixth shift region V[6] is non-defective since the calculated volume of the sixth shift region V[6] of 1.7 mm3 is equal to or smaller than the first threshold T1=4.0 mm3.

The data processing unit 36 calculates a volume of the seventh shift region V[7], determines that the seventh shift region V[7] is defective since the calculated volume of the seventh shift region V[7] of 8.5 mm3 is equal to or larger than the first threshold T1=4.0 mm3, and executes determination (detection) of a start point of a defective segment from the seventh shift region V[7] since the previous shift region (that is, the sixth shift region V[6]) is non-defective. Specifically, the data processing unit 36 determines, as a start point RCF1 of a defective segment RCF in the defect, a window ΔV[8] at a center position of three windows forming the seventh shift region V[7]. After the data processing unit 36 determines the start point RCF1 of the defective segment RCF, the data processing unit 36 changes a threshold used for defect determination from the first threshold T1 to the second threshold T2.

The data processing unit 36 calculates a volume of the eighth shift region V[8], and determines that the eighth shift region V[8] is defective since the calculated volume of the eighth shift region V[8] of 9.0 mm3 is not equal to or smaller than the second threshold T2=3.2 mm3. In addition, since there is no next shift region after the defect determination of the eighth shift region V[8], the data processing unit 36 executes determination (detection) of an end point of the defective segment from the eighth shift region V[8]. Specifically, the data processing unit 36 determines, as an end point RCF2 of the defective segment RCF in the defect, a window ΔV[9] at a center position of three windows forming the eighth shift region V[8].

The data processing unit 36 generates, as a result of the defect determination and the defective segment determination (detection) of the shape mismatch data ED4 shown in FIG. 13, an appearance inspection report including information regarding the first defective segment RCE (that is, position information of the start point RCE1 and the end point RCE2) and information regarding the second defective segment RCF (that is, position information of the start point RCF1 and the end point RCF2), and ends the processings of the defect determination and the defective segment determination (detection) of the shape mismatch data ED4 shown in FIG. 13.

After the processings of the defect determination and the defective segment determination (detection), the data processing unit 36 executes a processing of calculating coordinates of the start point and the end point of the defective segment as a repair welding segment for causing the welding robot MC1 to actually execute the repair welding. The data processing unit 36 separately extracts, from the shape mismatch data ED4, point cloud data of each window ΔV[k] including each position of each start point and each end point obtained as a determination result. In an example shown in FIG. 14, the data processing unit 36 extracts point cloud data ED41 of the window ΔV[4] including the position of the start point RCE1 in the defective segment RCE, point cloud data ED42 of the window ΔV[6] including the position of the end point RCE2 in the defective segment RCE, point cloud data ED43 of the window ΔV[9] including the position of the start point RCF1 in the defective segment RCF, and point cloud data ED44 of a window ΔV[10] including the position of the end point RCF2 in the defective segment RCF.

The data processing unit 36 calculates barycentric coordinates of each of the extracted point cloud data ED41 to ED44, and outputs the calculated barycentric coordinates as coordinates for executing the repair welding by the welding robot MC1. Specifically, in the example shown in FIG. 14, the data processing unit 36 calculates, based on each of the extracted point cloud data, coordinates (X1, Y1, Z1) of the start point RCE1 in the defective segment RCE, coordinates (X2, Y2, Z2) of the end point RCE2 in the defective segment RCE, coordinates (X3, Y3, Z3) of the start point RCF1 in the defective segment RCF, and coordinates (X4, Y4, Z4) of the end point RCF2 in the defective segment RCF.

It should be noted that the barycentric coordinates of each of the point cloud data ED41 to ED44 calculated here are not limited to the barycentric coordinates calculated based on each of the point cloud data ED41 to ED44, and may be barycentric coordinates calculated based on a part of each of the point cloud data ED41 to ED44. For example, when the data processing unit 36 calculates coordinates of a start point in the defective segment, the data processing unit 36 may calculate barycentric coordinates of point cloud data in a segment of ΔD/2 or ΔD/3 (that is, a part) in a direction same as a welding direction M3 from a position having the cross-sectional area S[k] corresponding to the k-th window ΔV[k] including a position of the start point. In addition, in a cut surface used for calculation of the coordinates of the end point of the defective segment, barycentric coordinates of point cloud data in a segment of ΔD/2 or ΔD/3 (that is, a part) in a direction opposite to the welding direction M3 from a position having a cross-sectional area S[k+1] corresponding to the (k+1)-th window ΔV[k+1] continuous to the k-th window ΔV[k] including a position of the end point may be calculated.

The data processing unit 36 generates, as a result of the defect determination and the defective segment determination (detection) of the shape mismatch data ED4, an appearance inspection report including information regarding the first defective segment RCE (that is, position (coordinate) information of the start point RCE1 and the end point RCE2) and information regarding the second defective segment RCF (that is, position (coordinate) information of the start point RCF1 and the end point RCF2), and ends the processings of calculating the coordinates of the start point and the end point of the defective segment of the shape mismatch data ED4 shown in FIG. 13.

Figure 15:
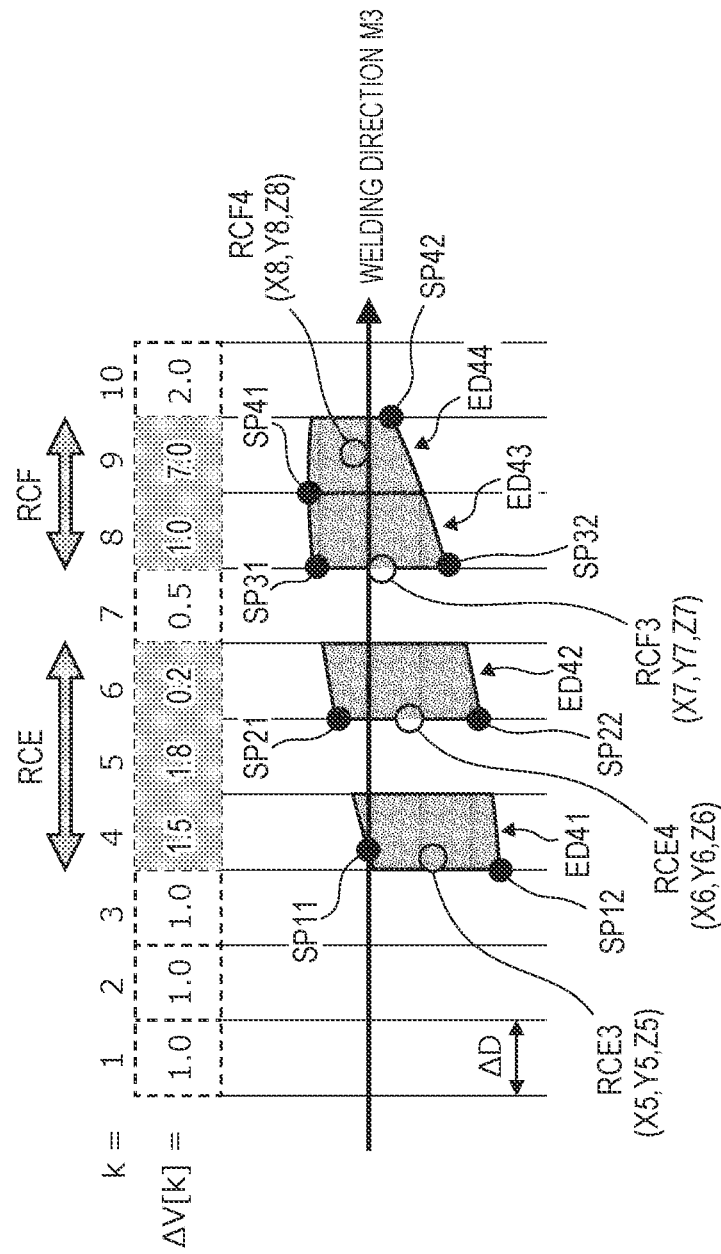
FIG. 15 is a diagram illustrating an example of calculating coordinates of a start point and an end point in a defective segment according to the modification of the embodiment.

It should be noted that a method of calculating the coordinates of the start point and the end point of the defective segment is not limited to the example described above. Hereinafter, another method of calculating the coordinates of the start point and the end point of the defective segment executed by the data processing unit 36 will be described with reference to FIG. 15 and FIG. 16. FIG. 15 is a diagram illustrating an example of calculating coordinates of a start point and an end point in a defective segment according to the modification of the embodiment.

In an example shown in FIG. 15, the data processing unit 36 extracts, from each of the extracted point cloud data ED41 to ED44, a point closest to the welding direction M3 (that is, the operation trajectory of the welding robot MC1) and a point farthest from the welding direction M3, and calculates, as the coordinates of the start point or the end point in the defective segment, coordinates of a middle point between the two extracted points.

Specifically, the data processing unit 36 extracts, from the extracted point cloud data ED41, a point SP11 closest to the welding direction M3 and a point SP12 farthest from the welding direction M3, calculates coordinates of a middle point of the two extracted points as coordinates (X5, Y5, Z5) of a start point RCE3 in the defective segment RCE, extracts, from the extracted point cloud data ED42, a point SP21 closest to the welding direction M3 and a point SP22 farthest from the welding direction M3, and calculates coordinates of a middle point between the two extracted points as coordinates (X6, Y6, Z6) of an end point RCE4 in the defective segment RCE. In addition, similarly, the data processing unit 36 extracts, from the extracted point cloud data ED43, a point SP31 closest to the welding direction M3 and a point SP32 farthest from the welding direction M3, calculates coordinates of a middle point of the two extracted points as coordinates (X7, Y7, Z7) of a start point RCF3 in the defective segment RCF, extracts, from the extracted point cloud data ED44, a point SP41 closest to the welding direction M3 and a point SP42 farthest from the welding direction M3, and calculates coordinates of a middle point between the two extracted points as coordinates (X8, Y8, Z8) of an end point RCF4 in the defective segment RCF.

The data processing unit 36 generates, as a result of the defect determination and the defective segment determination (detection) of the shape mismatch data ED4, an appearance inspection report including information regarding the first defective segment RCE (that is, position (coordinate) information of the start point RCE3 and the end point RCE4) and information regarding the second defective segment RCF (that is, position (coordinate) information of the start point RCF3 and the end point RCF4).

Figure 16:
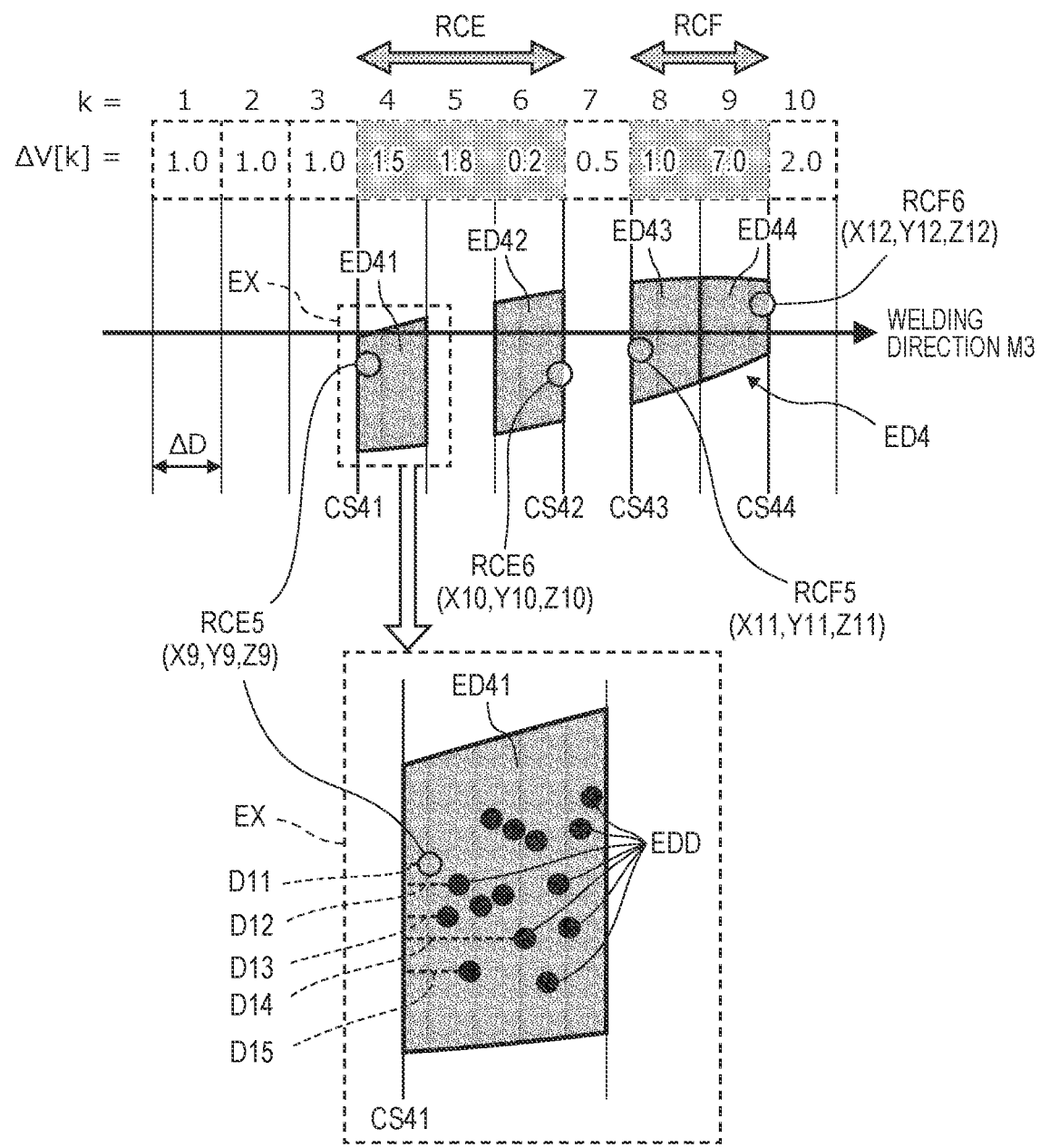
FIG. 16 is a diagram illustrating an example of calculating coordinates of a start point and an end point in a defective segment according to the modification of the embodiment.

FIG. 16 is a diagram illustrating an example of calculating coordinates of a start point and an end point in a defective segment according to the modification of the embodiment. It should be noted that in FIG. 16, a method of calculating coordinates will be described in detail with reference to an enlarged view EX obtained by enlarging the point cloud data ED41 of the window ΔV[4] including a start point RCE5 of the defective segment RCE, and illustration of enlarged views of the other point cloud data ED42. ED43, and ED44 is omitted.

In an example shown in FIG. 16, the data processing unit 36 separately extracts, from the shape mismatch data ED4, point cloud data of each window ΔV[k] including each position of each start point and each end point obtained as a determination result. When the extracted point cloud data of the window ΔV[k] includes a position of a start point in a defective segment, the data processing unit 36 calculates, as coordinates of the start point in the defective segment, coordinates of a point closest to a cut surface corresponding to the window ΔV[k] (that is, a cut surface (plane) forming the cross-sectional area S[k] used for calculation of a volume of the window ΔV[k]) among points included in the point cloud data. In addition, when the point cloud data of the window ΔV[k] includes a position of an end point in the defective segment, the data processing unit 36 calculates, as coordinates of the end point in the defective segment, coordinates of a point closest to a cut surface corresponding to the window ΔV[k+1] (that is, a cut surface (plane) forming the cross-sectional area S[k+1] used for calculation of a volume of the window ΔV[k+1]) next to the extracted window ΔV[k]. In other words, in calculation of the coordinates of the end point in the defective segment, when the point cloud data of the window ΔV[k] includes a position of the end point in the defective segment, the data processing unit 36 calculates, as the coordinates of the end point in the defective segment, coordinates of a point farthest from a cut surface corresponding to the window ΔV[k] (that is, a cut surface (plane) forming the cross-sectional area S[k] used for calculation of a volume of the window ΔV[k]) among points included in the point cloud data.

In the example shown in FIG. 16, an equation for calculating coordinates of a point as the start point or the end point of the defective segment is shown in (Equation 1). (Equation 1) is an equation showing a cut surface (plane). (Equation 2) is an equation for calculating a distance DO between the cut surface and the point as the start point or the end point. It should be noted that here, a normal vector of the cut surface (plane) is (A, B, C). The coordinates of the point as the start point or the end point of the defective segment are assumed to be coordinates (X0, Y0, Z0).

[Equation 1]
$$AX + BY + CZ + D = 0 \quad (1)$$

[Equation 2]
$$D0 = \frac{|AX0 + BY0 + CZ0 + D|}{\sqrt{A^2 + B^2 + C^2}} \quad (2)$$

Specifically, the data processing unit 36 calculates distances D11, D12, D13, D14, D15 between each of a plurality of points EDD included in the extracted point cloud data ED41 and a cut surface CS41 corresponding to the window ΔV[4] including the start point RCE5 of the defective segment RCF, and calculates, as coordinates (X9, Y9, Z9) of the start point RCE5 of the defective segment RCE, coordinates of a point closest to the cut surface CS41 (in the example shown in FIG. 16, the distance D11 is the smallest value) among the calculated respective distances D11 to D15 of the plurality of points. It should be noted that reference numerals of the points EDD in the point cloud data ED41 shown in FIG. 16 are shown only for some points, and are omitted for other points and the start point RCE5. Similarly, reference numerals indicating the distances between each of the plurality of points EDD and the cut surface CS41 are shown only for some of the points EDD, and are omitted for other points.

The data processing unit 36 calculates distances between each of a plurality of points (not shown) included in the extracted point cloud data ED42 and a cut surface CS42 corresponding to a next window ΔV[7] adjacent to the window ΔV[6] including an end point RCE6 of the defective segment RCE, and calculates, as coordinates (X10, Y10, Z10) of the end point RCE6 of the defective segment RCE, coordinates of a point closest to the cut surface CS42 among the calculated distances between each of the plurality of points and the cut surface CS42. It should be noted that the data processing unit 36 may calculate distances between each of a plurality of points (not shown) included in the extracted point cloud data ED42 and a cut surface corresponding to the window ΔV[6] including the end point RCE6 of the defective segment RCE, and may calculate, as the coordinates (X10, Y10, Z10) of the end point RCE6 of the defective segment RCE, coordinates of a point farthest from the cut surface among the calculated distances between each of the plurality of points and the cut surface.

Similarly, the data processing unit 36 calculates distances between each of a plurality of points (not shown) included in the extracted point cloud data ED43 and a cut surface CS43 corresponding to the window ΔV[8] including a start point RCF5 of the defective segment RCF, and calculates, as coordinates (X11, Y11, Z11) of the start point RCF5 of the defective segment RCF, coordinates of a point farthest from the cut surface CS43 among the calculated distances between each of the plurality of points and the cut surface CS43. In addition, the data processing unit 36 calculates distances between each of a plurality of points (not shown) included in the extracted point cloud data ED44 and a cut surface CS44 corresponding to a next window ΔV[10] adjacent to the window ΔV[9] including an end point RCF6 of the defective segment RCF, and calculates, as coordinates (X12, Y12, Z12) of the end point RCF6 of the defective segment RCF, coordinates of a point closest to the cut surface CS44 among the calculated distances between each of the plurality of points and the cut surface CS44.

The data processing unit 36 generates, as a result of the defect determination and the defective segment determination (detection) of the shape mismatch data ED4, an appearance inspection report including information regarding the first defective segment RCE (that is, position (coordinate) information of the start point RCE5 and the end point RCE6) and information regarding the second defective segment RCF (that is, position (coordinate) information of the start point RCF5 and the end point RCF6).

As described above, according to the embodiment and the modification of the embodiment, the inspection control device 3 as an example of the repair welding segment detection device inputs input data (for example, point cloud data) regarding a weld bead of the workpiece Wk produced by welding, executes inspection determination regarding a shape of the weld bead by using the input data and master data of a non-defective workpiece, generates, based on a result of the inspection determination, shape mismatch data obtained by extracting a shape mismatch portion of the weld bead, divides the shape mismatch data into N (N: an integer of 2 or more) equally divided windows in a direction perpendicular to a welding direction of the weld bead, sets a shift region formed by i (i: an integer of 1 or more) continuous windows among the N windows, separately calculates volumes of (N−i+1) shift regions obtained by shifting one by one the i windows forming the shift region in the welding direction, and determines that a shift region having a volume of a predetermined value or more among the calculated volumes of the (N−i+1) respective shift regions is a defective segment of the weld bead.

Accordingly, according to the embodiment and the modification of the embodiment, the inspection control device 3 can more accurately determine, based on a volume of a shape mismatch portion per reference length (that is, the interval ΔD), whether there is a defect that does not satisfy the quality standard of the user and is to be repair welded, and determines, based on a shift region determined as a defective portion, a start point and an end point of the defective segment to be repair welded.

In addition, as described above, according to the embodiment and the modification of the embodiment, the inspection control device 3 sequentially executes, (N−i+1) times along the welding direction, the processings of calculating the volumes of the (N−i+1) respective shift regions and determining the defective segment. Accordingly, according to the embodiment and the modification of the embodiment, the inspection control device 3 can execute the defect determination of the shift region while shifting at the interval ΔD, and thus, the inspection control device 3 can more accurately detect a position of a defective portion (that is, the defective segment) that does not satisfy the quality standard of the user and is to be repair welded.

In addition, as described above, according to the embodiment and the modification of the embodiment, the inspection control device 3 determines, as a start point of the defective segment, a first window among the i windows included in one or more shift regions determined to be the defective segment and determines an i-th window as an end point of the defective segment. In the determination method, for example, when one discontinuous shift region is determined to be defective, the inspection control device 3 determines (detects) the entire region of the shift region as the defective segment, and when two or more continuous shift regions are determined to be defective, the inspection control device 3 detects the entire region of the two or more shift regions as the defective segment. Accordingly, according to the embodiment and the modification of the embodiment, the inspection control device 3 can more accurately determine a position of a defective portion (that is, the defective segment) to be repair welded in the shape mismatch portion, and can prevent an oversight in detection of the defective segment.

In addition, as described above, according to the embodiment and the modification of the embodiment, when two or more continuous shift regions are determined to be the defective segment, the inspection control device 3 determines, as a start point of the defective segment, a first window among the i windows forming a shift region firstly determined as the defective segment among the two or more continuous shift regions, and determines, as an end point of the defective segment, an i-th window among the i windows included in a shift region last determined as the defective segment. Accordingly, according to the embodiment and the modification of the embodiment, the inspection control device 3 can more accurately detect the defective segment to be repair welded in the shape mismatch portion.

In addition, as described above, according to the embodiment and the modification of the embodiment, when a first shift region among the (N−i+1) shift regions is determined as the defective segment, the inspection control device 3 determines, as a start point of the defective segment, a first window among the i windows forming the first shift region. Accordingly, according to the embodiment and the modification of the embodiment, the inspection control device 3 can detect, in the first shift region PS1 where it is difficult to specify a position of a defect to be repair welded, a defective segment for repair welding of all the defects in the first shift region PS1.

In addition, as described above, according to the embodiment and the modification of the embodiment, when an (N−i+1)-th shift region among the (N−i+1) shift regions is determined as the defective segment, the inspection control device 3 determines, as an end point of the defective segment, an i-th window among the i windows forming the (N−i+1)-th shift region. Accordingly, according to the embodiment and the modification of the embodiment, the inspection control device 3 can detect a defective segment for repair welding of all the defects in the (N−i+1)-th shift region PS(N−i+1) where it is difficult to specify a position of a defect to be repair welded.

In addition, as described above, according to the embodiment and the modification of the embodiment, when two or more continuous shift regions are determined to be the defective segment, the inspection control device 3 determines, as a start point of the defective segment, a center position of a shift region firstly determined as the defective segment, and determines, as an end point, a center position of the shift region last determined as the defective segment. Accordingly, according to the embodiment and the modification of the embodiment, the inspection control device 3 can more accurately detect the defective segment to be repair welded in the shape mismatch portion.

In addition, as described above, according to the modification of the embodiment, when any k-th shift region among the (N−i+1) shift regions is determined to be the defective segment, the inspection control device 3 sets, as a start point of the defective segment, any window included in the shift region and determines whether a volume of a (k+1)-th shift region continuous to the shift region is equal to or smaller than a second threshold (an example of the second predetermined value) smaller than a first threshold (an example of the predetermined value), and when the volume of the (k+1)-th shift region is equal to or smaller than the second predetermined value, the inspection control device 3 determines, as an end point of the defective segment, any window forming the (k+1)-th shift region. Accordingly, according to the modification of the embodiment, when start of a defect is determined in determination of a defective segment (repair welding segment) to be repair welded, the inspection control device 3 can tighten a criterion for determining to be non-defective (end of the defect) in defect determination of continuous shift regions. That is, since the inspection control device 3 determines that the defective segment does not end when a volume of the shift region (in other words, a volume difference between an appearance shape of a weld bead and master data) is not equal to or smaller than the second threshold, the inspection control device 3 can determine (detect) a defective segment, which can further prevent occurrence of an oversight in repair in repair welding to be executed based on the generated information regarding the defective segment.

In addition, as described above, according to the modification of the embodiment, when the volume of the (k+1)-th shift region is not equal to or smaller than the second threshold (an example of the second predetermined value), the inspection control device 3 determines whether a volume of a (k+2)-th shift region continuous to the (k+1)-th shift region is equal to or smaller than the second threshold, and repeatedly executes the determination until any one of calculated volumes of shift regions is determined to be equal to or smaller than the second threshold, and determines, as the end point of the defective segment, any window forming the shift region having a volume determined to be equal to or smaller than the second threshold. Accordingly, according to the modification of the embodiment, the inspection control device 3 can continue the defect determination while setting the criterion for determining to be non-defective (end of a defect) to a tighter second threshold until any one of the continuous shift regions is determined to be non-defective.

In addition, as described above, according to the modification of the embodiment, when a volume of an (N−i+1)-th shift region is determined to be not equal to or smaller than the second threshold (an example of the second predetermined value) by the determination, the inspection control device 3 determines, as the end point of the defective segment, any window forming the (N−i+1)-th shift region. Accordingly, according to the modification of the embodiment, even though the (N−i+1)-th shift region is determined to be defective, the inspection control device 3 can detect a defective segment for repair welding of all the defects in the (N−i+1)-th shift region PS(N−i+1).

In addition, as described above, according to the modification of the embodiment, the inspection control device 3 determines, as coordinates of the start point (for example, the start point RCE1 shown in FIG. 14), barycentric coordinates (for example, the coordinates (X1, Y1, Z1) shown in FIG. 14) of a window including the start point of the defective segment (for example, the window ΔV[4] including the start point RCE1 shown in FIG. 14). Accordingly, according to the modification of the embodiment, the inspection control device 3 can calculate coordinates of a start point for welding each defective segment in repair welding of each defective segment to be executed by the welding robot MC1. In addition, since the inspection control device 3 calculates coordinates based on barycentric coordinates of shape mismatch data (point cloud data) in each window, the inspection control device 3 can arrange the welding torch 400 at a more appropriate position.

In addition, as described above, according to the modification of the embodiment, the inspection control device 3 determines, as the coordinates of the start point, coordinates of a middle point (for example, the coordinates (X5, Y5, Z5) shown in FIG. 15) between a point (for example, the point SP11 shown in FIG. 15) closest to and a point (for example, the point SP12 shown in FIG. 15) farthest from a welding trajectory (for example, the operation trajectory of the welding robot MC1 indicated by the welding direction M3 shown in FIG. 15) of the weld bead in the window including the start point (for example, the start point RCE3 shown in FIG. 15). Accordingly, according to the modification of the embodiment, the inspection control device 3 can calculate coordinates of a start point for welding each defective segment in repair welding of each defective segment to be executed by the welding robot MC1, and thus, the inspection control device 3 can arrange the welding torch 400 at a more appropriate position.

In addition, as described above, according to the modification of the embodiment, the inspection control device 3 determines, as coordinates of the end point (for example, the end point RCE2 shown in FIG. 14), barycentric coordinates (for example, the coordinates (X2, Y2, Z2) shown in FIG. 14) of a window including the end point of the defective segment (for example, the window ΔV[6] including the end point RCE2 shown in FIG. 14). Accordingly, according to the modification of the embodiment, the inspection control device 3 can calculate coordinates of an end point for welding each defective segment in repair welding of each defective segment to be executed by the welding robot MC1. In addition, since the inspection control device 3 calculates coordinates based on barycentric coordinates of shape mismatch data (point cloud data) in each window, the inspection control device 3 can arrange the welding torch 400 at a more appropriate position.

In addition, as described above, according to the modification of the embodiment, the inspection control device 3 determines, as the coordinates of the end point, coordinates of a middle point (for example, the coordinates (X6, Y6, Z6) shown in FIG. 15) between a point (for example, the point SP21 shown in FIG. 15) closest to and a point (for example, the point SP22 shown in FIG. 15) farthest from a welding trajectory (for example, the operation trajectory of the welding robot MC1 indicated by the welding direction M3 shown in FIG. 15) of the weld bead in the window including the end point (for example, the end point RCE4 shown in FIG. 15). Accordingly, according to the modification of the embodiment, the inspection control device 3 can calculate coordinates of an end point for welding each defective segment in repair welding of each defective segment to be executed by the welding robot MC1, and thus, the inspection control device 3 can arrange the welding torch 400 at a more appropriate position.

In addition, as described above, according to the modification of the embodiment, the inspection control device 3 determines, as coordinates of the start point, coordinates (for example, the coordinates (X9, Y9, Z9) shown in FIG. 16) of a point closest to a cut surface (for example, the cut surface CS41 corresponding to the window ΔV[4] shown in FIG. 16) of the shape mismatch data corresponding to a window including the start point (for example, the start point RCE5 shown in FIG. 16) of the defective segment. Accordingly, according to the modification of the embodiment, the inspection control device 3 can calculate coordinates of a start point for welding each defective segment in repair welding of each defective segment to be executed by the welding robot MC1, and thus, the inspection control device 3 can arrange the welding torch 400 at a more appropriate position.

In addition, as described above, according to the modification of the embodiment, the inspection control device 3 determines, as coordinates of the end point, coordinates (for example, the coordinates (X10, Y10, Z10) shown in FIG. 16) of a point closest to a cut surface (for example, the cut surface CS42 corresponding to the window ΔV[6] shown in FIG. 16) of the shape mismatch data corresponding to a next window adjacent to a window including the end point (for example, the end point RCE6 shown in FIG. 16) of the defective segment. Accordingly, according to the modification of the embodiment, the inspection control device 3 can calculate coordinates of an end point for welding each defective segment in repair welding of each defective segment to be executed by the welding robot MC1, and thus, the inspection control device 3 can arrange the welding torch 400 at a more appropriate position.

In addition, as described above, according to the embodiment and the modification of the embodiment, the inspection control device 3 outputs, as a repair welding condition, the defective segment and information regarding the volume in the defective segment in association with each other. Accordingly, according to the embodiment and the modification of the embodiment, the inspection control device 3 can output, in association with the information regarding the defective segment, the repair welding condition such as the feeding amount of the welding wire 301 necessary for creating a repair welding program or control parameters (the welding current value or the welding voltage value) of the power supply device 500, and thus the inspection control device 3 can assist in generating a repair welding program that enables more accurate repair welding of the detected defective segment.

Although various embodiments are described above with reference to the drawings, it is needless to say that the present disclosure is not limited to such examples. It will be apparent to those skilled in the art that various changes, corrections, substitutions, additions, deletions, and equivalents can be conceived within the scope of the claims, and it should be understood that such changes, corrections, substitutions, additions, deletions, and equivalents also fall within the technical scope of the present disclosure. In addition, components in the various embodiments described above may be combined freely in a range without deviating from the spirit of the invention.

It should be noted that the present application is based on a Japanese patent application (Japanese Patent Application NO. 2020-180663) filed on Oct. 28, 2020, the contents of which are incorporated herein by reference.

INDUSTRIAL APPLICABILITY

The present disclosure is useful as a repair welding segment detection method and a repair welding segment detection device that more accurately detect a repair welding segment of a workpiece produced by main welding.

What is claimed is:
1. A repair welding segment detection method comprising:
  entering input data regarding a weld bead of a workpiece produced by welding;
  executing inspection determination regarding a shape of the weld bead by using the input data and master data of a non-defective workpiece;
  generating, based on a result of the inspection determination, shape mismatch data obtained by extracting a shape mismatch portion of the weld bead;
  dividing the shape mismatch data into N, where N is an integer of 2 or more, equally divided windows in a direction perpendicular to a welding direction of the weld bead;
  setting a shift region formed by i, where i: an integer of 1 or more, continuous windows among the N windows;
  separately calculating volumes of (N−i+1) shift regions obtained by shifting one by one the i windows forming the shift region in the welding direction; and
  determining that a shift region having a volume of a predetermined value or more among the calculated volumes of the (N−i+1) respective shift regions is a defective segment of the weld bead.

2. The repair welding segment detection method according to claim 1, wherein
  the processings of calculating the volumes of the (N−i+1) respective shift regions and determining the defective segment are sequentially executed (N−i+1) times along the welding direction.

3. The repair welding segment detection method according to claim 2, further comprising:
  in a case that two or more continuous shift regions are determined to be the defective segment, determining, as a start point of the defective segment, a first window among the i windows forming a shift region firstly determined as the defective segment among the two or more continuous shift regions, and determining, as an end point of the defective segment, an i-th window among the i windows included in a shift region last determined as the defective segment.

4. The repair welding segment detection method according to claim 2, further comprising:
  in a case that a first shift region among the (N−i+1) shift regions is determined as the defective segment, determining, as a start point of the defective segment, a first window among the i windows forming the first shift region.

5. The repair welding segment detection method according to claim 2, further comprising:
  in a case that an (N−i+1)-th shift region among the (N−i+1) shift regions is determined as the defective segment, determining, as an end point of the defective segment, an i-th window among the i windows forming the (N−i+1)-th shift region.

6. The repair welding segment detection method according to claim 2, further comprising:
  in a case that two or more continuous shift regions are determined to be the defective segment, determining, as a start point of the defective segment, a center position of a shift region firstly determined as the defective segment, and determining, as an end point, a center position of the shift region last determined as the defective segment.

7. The repair welding segment detection method according to claim 2, further comprising:
  in a case that any k-th, where k is an integer of 1 or more, shift region among the (N−i+1) shift regions is determined to be the defective segment, setting, as a start point of the defective segment, any window included in the shift region and determining whether a volume of a (k+1)-th shift region continuous to the shift region is equal to or smaller than a second predetermined value smaller than the predetermined value; and
  in a case that the volume of the (k+1)-th shift region is equal to or smaller than the second predetermined value, determining, as an end point of the defective segment, any window forming the (k+1)-th shift region.

8. The repair welding segment detection method according to claim 7, further comprising:
  in a case that the volume of the (k+1)-th shift region is not equal to or smaller than the second predetermined value, determining whether a volume of a (k+2)-th shift region continuous to the (k+1)-th shift region is equal to or smaller than the second predetermined value, and repeatedly executing the determination until any one of calculated volumes of shift regions is determined to be equal to or smaller than the second predetermined value, and determining, as the end point of the defective segment, any window forming the shift region having a volume determined to be equal to or smaller than the second predetermined value.

9. The repair welding segment detection method according to claim 8, further comprising:

in a case that a volume of an (N−i+1)-th shift region is determined to be not equal to or smaller than the second predetermined value by the determination, determining, as the end point of the defective segment, any window forming the (N−i+1)-th shift region.

10. The repair welding segment detection method according to claim 1, further comprising:

determining, as a start point of the defective segment, a first window among the i windows included in the shift region determined to be the defective segment, and determining an i-th window as an end point of the defective segment.

11. The repair welding segment detection method according to claim 10, further comprising:

determining, as coordinates of the start point, barycentric coordinates of a window including the start point of the defective segment.

12. The repair welding segment detection method according to claim 11, further comprising:

determining, as the coordinates of the start point, coordinates of a middle point between a point closest to and a point farthest from a welding trajectory of the weld bead in the window including the start point.

13. The repair welding segment detection method according to claim 10, further comprising:

determining, as coordinates of the end point, barycentric coordinates of a window including the end point of the defective segment.

14. The repair welding segment detection method according to claim 13, further comprising:

determining, as the coordinates of the end point, coordinates of a middle point between a point closest to and a point farthest from a welding trajectory of the weld bead in the window including the end point.

15. The repair welding segment detection method according to claim 10, further comprising:

determining, as coordinates of the start point, coordinates of a point closest to a cut surface of the shape mismatch data corresponding to a window including the start point of the defective segment.

16. The repair welding segment detection method according to claim 10, further comprising:

determining, as coordinates of the end point, coordinates of a point closest to a cut surface of the shape mismatch data corresponding to a next window adjacent to a window including the end point of the defective segment.

17. The repair welding segment detection method according to claim 1, further comprising:

outputting, as a repair welding condition, the defective segment and information regarding the volume in the defective segment in association with each other.

18. A repair welding segment detection device comprising:

an input unit configured to enter input data regarding a weld bead of a workpiece produced by welding;

a determination unit configured to execute inspection determination regarding a shape of the weld bead by using the input data and master data of a non-defective workpiece:

a data generation unit configured to generate, based on an inspection determination result obtained by the determination unit, shape mismatch data obtained by extracting a shape mismatch portion of the weld bead;

a calculation unit configured to divide the shape mismatch data into N, where N is an integer of 2 or more, equally divided windows in a direction perpendicular to a welding direction of the weld bead, set a shift region formed by i, where i is an integer of 1 or more, continuous windows among the respective windows, and separately calculate volumes of (N−i+1) respective shift regions obtained by shifting one by one the i windows forming the shift region in the welding direction; and a generation unit configured to determine that a shift region having a volume of a predetermined value or more among the calculated volumes of the (N−i+1) shift regions is a defective segment of the weld bead, and generate information regarding the defective segment.

* * * * *